US008533409B2

(12) United States Patent
Schnapp et al.

(10) Patent No.: US 8,533,409 B2
(45) Date of Patent: Sep. 10, 2013

(54) METHOD OF MANAGING DATA SNAPSHOT IMAGES IN A STORAGE SYSTEM

(75) Inventors: Michael Gordon Schnapp, Banqiao (TW); Ching-Te Pang, Yonghe (TW); Chien-Hsin Chiang, Taipei (TW)

(73) Assignee: Infortrend Technology, Inc., Chung-Ho, Taipei Hsien (TW)

( * ) Notice: Subject to any disclaimer, the term of this patent is extended or adjusted under 35 U.S.C. 154(b) by 451 days.

(21) Appl. No.: 11/657,450

(22) Filed: Jan. 25, 2007

(65) Prior Publication Data

US 2007/0174569 A1 Jul. 26, 2007

Related U.S. Application Data

(60) Provisional application No. 60/743,174, filed on Jan. 26, 2006.

(51) Int. Cl.
*G06F 12/00* (2006.01)
*G06F 3/06* (2006.01)
(52) U.S. Cl.
USPC .... 711/162; 711/154; 711/114; 711/E12.103; 714/6.2; 714/6.3; 714/E11.119
(58) Field of Classification Search
USPC .................................................. 711/114, 162
See application file for complete search history.

(56) References Cited

U.S. PATENT DOCUMENTS

| 5,819,292 | A  * | 10/1998 | Hitz et al. ..................... 707/203 |
| 6,594,744 | B1   | 7/2003  | Humlicek et al. |
| 6,824,426 | B1 * | 11/2004 | Spink, Jr. ....................... 439/579 |
| 6,877,109 | B2 * | 4/2005  | Delaney et al. .................... 714/6 |
| 7,028,158 | B1 * | 4/2006  | Beatty et al. .................... 711/165 |
| 7,254,682 | B1 * | 8/2007  | Arbon ........................... 711/161 |
| 7,757,057 | B2 * | 7/2010  | Sangapu et al. .............. 711/162 |
| 7,849,257 | B1 * | 12/2010 | Kim ............................... 711/112 |
| 2002/0083037 | A1 * | 6/2002 | Lewis et al. ....................... 707/1 |
| 2002/0112113 | A1 | 8/2002 | Karpoff et al. |

(Continued)

FOREIGN PATENT DOCUMENTS

CN  1530841 A  9/2004

OTHER PUBLICATIONS

Hitz et al., Technical Report TR 3002. File System Design for a NFS File Server Appliance. Network Appliance, Inc. (NetApp), 2005.*

(Continued)

*Primary Examiner* — Alford Kindred
*Assistant Examiner* — Daniel Bernard
(74) *Attorney, Agent, or Firm* — Muncy, Geissler, Olds & Lowe, PLLC

(57) ABSTRACT

This specification discloses a method of managing data snapshot images in a storage system. The method includes the steps of: establishing a section allocation system that includes at least a media extent; establishing a section allocation table and a block association set in the media extent, wherein the section allocation table has a field containing information pointing to the block association set and the block association set corresponds to a Source Volume as the basis for performing a snapshot backup thereof; establishing a block association table in the block association set, wherein the block association table is used to store cross-reference information in order to correspond to backup data with the original storage addresses; and copying the data before updating the data into the section association set, when the data in the Source-Volume need to be updated.

38 Claims, 23 Drawing Sheets

(56) References Cited

U.S. PATENT DOCUMENTS

| | | | |
|---|---|---|---|
| 2003/0097611 A1* | 5/2003 | Delaney et al. | 714/13 |
| 2003/0229748 A1* | 12/2003 | Brewer et al. | 710/305 |
| 2004/0068636 A1* | 4/2004 | Jacobson et al. | 711/203 |
| 2004/0193736 A1* | 9/2004 | Galloway | 710/1 |
| 2004/0215421 A1 | 10/2004 | Schmitz et al. | |
| 2005/0005044 A1* | 1/2005 | Liu et al. | 710/74 |
| 2005/0005062 A1* | 1/2005 | Liu et al. | 711/112 |
| 2005/0015416 A1* | 1/2005 | Yamagami | 707/204 |
| 2005/0055603 A1 | 3/2005 | Soran et al. | |
| 2005/0102549 A1* | 5/2005 | Davies et al. | 714/4 |
| 2005/0198062 A1* | 9/2005 | Shapiro | 707/102 |
| 2005/0216535 A1 | 9/2005 | Saika et al. | |
| 2005/0223180 A1 | 10/2005 | Derbeko | |
| 2005/0228937 A1* | 10/2005 | Karr et al. | 711/6 |
| 2005/0246397 A1* | 11/2005 | Edwards et al. | 707/204 |
| 2005/0246401 A1* | 11/2005 | Edwards et al. | 707/205 |
| 2005/0289309 A1 | 12/2005 | Suzuki | |
| 2006/0101204 A1* | 5/2006 | Bao | 711/114 |
| 2006/0112251 A1* | 5/2006 | Karr et al. | 711/170 |
| 2007/0143563 A1* | 6/2007 | Pudipeddi et al. | 711/173 |
| 2007/0165660 A1* | 7/2007 | Fang et al. | 370/410 |

OTHER PUBLICATIONS

Ying, "Unveil the Newest Storage Interface Technology," China Academic Journal Electronic Publishing House, Issue No. 5, pp. 42-45, 2003.

\* cited by examiner

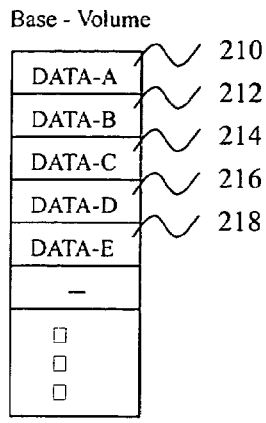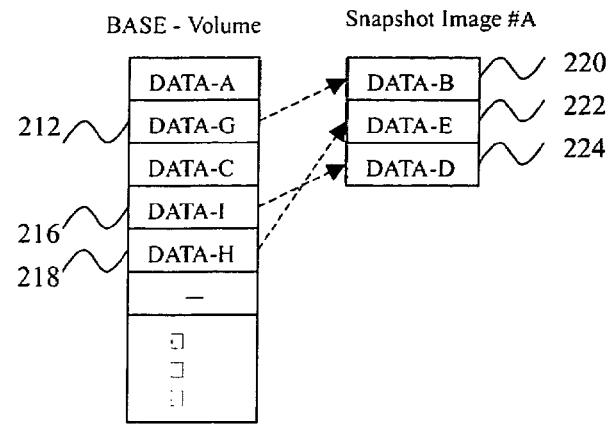
FIG. 1A
(PRIOR ART)
FIG. 1B
(PRIOR ART)
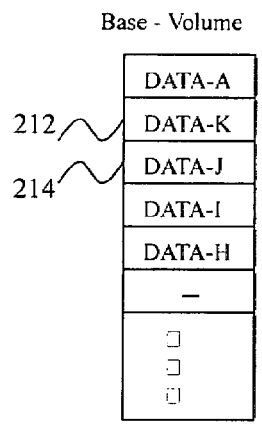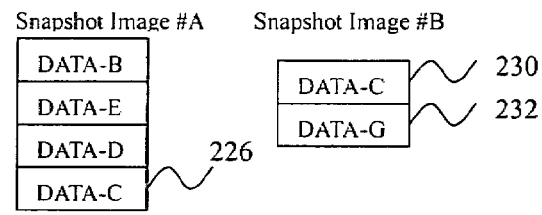
FIG. 1C
(PRIOR ART)

METHOD OF MANAGING DATA SNAPSHOT IMAGES IN A STORAGE SYSTEM

RELATED APPLICATIONS

This application claims priority to provisional patent applications Ser. No. 60/743,174, filed Jan. 26, 2006, and entitled "Method of Managing Data Snapshot Images In A Storage System", which is incorporated herein by reference.

BACKGROUND OF THE INVENTION

1. Field of the Invention

The present invention relates to the technology of data storage in a storage system, such as redundant array of inexpensive/independent disks (RAID). More particularly, the present invention relates to the management of the snapshot data in a storage system that utilizes the data snapshot copy technique.

2. Related Art

Nowadays, data storage and security are getting more and more important. Therefore, there are many modern developments in the storage media technology, where one of them is the invention of the RAID. Advantages of the RAID include better data storage efficiency and higher fault-tolerance, and the work load is distributed over many physical storage drives in a parallel manner, so that the better efficiency can be achieved. Through multiple manipulations of data, if one or several disk drive(s) or sector(s) has(have) problems, other disk drives can be used to re-construct the data through using the other disk drives, thereby achieving high fault-tolerance.

At present, one of the technologies, which has been implemented in the current storage systems, is the "snapshot." Generally speaking, the so-called Snapshot-Volume refers to the status of a Base-Volume at a particular moment or the status of a Source-Volume at a particular moment. Consequently, the Snapshot-Volume can be said to be a backup image, i.e., the snapshot of the Base-Volume or Source-Volume.

The snapshot is usually accompanied by a copy-on-write procedure. That is, the snapshot copies original data in the target sector, not the data in the entire Base-Volume, into the Snapshot-Image sector only when data are written/updated. Therefore, the Snapshot-Volume at each moment consists of the corresponding Snapshot-Image and the data blocks in the Base-Volume, where the data blocks in the Base-Volume are not copied to the Snapshot-Image.

Please refer to FIGS. 1A to 1C. FIG. 1A shows the status of the Base-Volume at the moment when the Snapshot-Volume-A is formed. FIG. 1B shows that the data blocks 212, 216, 218 in the Base-Volume are updated. Therefore, before the updating, the DATA-B, DATA-E, and DATA-D originally stored in it are copied to the Snapshot-Image #A. The rest of data that are not updated are not copied. In other words, the Snapshot-Volume-A consists of the Snapshot-Image #A and the data blocks 210, 214 of the Base-Volume, where the data blocks 210, 214 are not copied to the Snapshot-Image #A, so that the data status in the Base-Volume of FIG. 1A is shown. Next, FIG. 1C shows the moment when the Snapshot-Volume-B is formed, and shows that the data blocks 214, 212 in the Base-Volume are updated. When performing the copy-on-write procedure for the data block 214, DATA-C in the data block 214 is copied to the Snapshot-Image #A and the Snapshot-Image #B. The data block 212 has been performed with the copy-on-write procedure and, thus, has been copied to the Snapshot-Image #A. It should be noted that though the data stored at that moment was DATA-B, only the currently existing data DATA-G in the data block 212 needs to be copied to the Snapshot-Image #B. As a result, the Snapshot-Volume-A consists of the Snapshot-Image #A and the data block 210 in the Base-Volume, where the data block 210 is not copied to the Snapshot-Image #A, so as to re-construct the data status of the Base Volume at that moment as shown in FIG. 1A. On the other hand, the Snapshot-Volume-B consists of the Snapshot-Image #B and the data blocks 210, 216, 218 in the Base-Volume, where the data blocks are not copied to the Snapshot-Image #B, so as to re-construct the data status of the Base-Volume at the moment as shown in FIG. 1B.

It is clear from the above descriptions that Snapshot-Volume at each moment consists of the Snapshot Image and the data blocks of the Base Volume, where the data blocks are not copied to the Snapshot-Image at the each moment. Therefore, when writing the data, the data in the data block are copied to all the Snapshot Images that do not have that copy of the data block. That is, in addition to the latest Snapshot-Image, the former Snapshot-Images must be checked individually in order to determine which Snapshot-Image(s) need(s) to perform the copy-on-write procedure, which is very complicated and time-consuming. Moreover, when there are more moments for setting or for starting snapshots, the stored snapshots become more humongous, which will cause the problems of insufficient storage space and of management. Therefore, how to effectively manage snapshot storage space in order to increase the work efficiency is a priority in the art.

Besides, for the communication protocols used in the traditional storage virtualization systems having snapshot function, only one type of HDDs can be used therein. The HDDs, however, have the problem that either the quality is good but price is high, or the price is inexpensive but the quality is poor. For example, a SCSI HDD is a high quality but also high price HDD, while a SATA HDD is an inexpensive but lower quality HDD. Nonetheless, source volume is the storage space which is used frequently, but snapshot volume is a storage space which is not used so frequent. If the source volume is stored in the HDDs of high quality or performance and the snapshot volume is stored in the HDDs of lower quality or performance, the price can be lower with little impact on the quality or performance of the system. If, however, two types of communication protocol interfaces are provided in the storage system for the purpose of using two types of HDDs of different protocols, the cost to design and manufacture the system will be increased largely. Therefore, how to effectively manage snapshot storage space and to take cost and efficiency into consideration is also a priority in the art.

SUMMARY OF THE INVENTION

In view of the aspect, the present invention efficiently uses the snapshot storage space.

In view of the aspect, the present invention provides a method of managing snapshot images. The method includes the steps of: establishing a section allocation system that includes at least a media extent; establishing a section allocation table and a block association set in the media extent, wherein the section allocation table has a field containing information pointing to the block association set and the block association set corresponds to a source volume as the basis for performing a snapshot backup thereof; establishing a block association table in the block association set, wherein the block association table is used to store cross-reference information in order to correspond to backup data with the original storage addresses; and when data in the source volume are updated, copying the data before the update into the section association set.

Besides, the present invention also provides a storage virtualization computer system that includes: a host unit for sending an I/O request; an external storage virtualization controller (SVC) coupled to the host unit for executing an I/O operation in accord with the I/O request; and at least one physical storage device (PSD) coupled to the SVC via a serial attached SCSI for providing data storage space to the storage virtualization computer system via the SVC. The external SVC executes a snapshot function for storing the data state of at least one source volume consisted of the PSD at a particular time.

Moreover, the present invention provides a storage virtualization computer system having data Snapshot-Images management, in which there is a hard disk communication protocol interface, and two different kind qualities and efficiencies hard disk drives are used, where the Source-Volumes are stored into a first kind hard disk, and the Snapshot-Images are stored into a second kind hard disk, so that the cost can be reduced with having little negative impact on the quality and efficiency of the storage system.

BRIEF DESCRIPTION OF THE DRAWINGS

These and other features, aspects and advantages of the invention will become apparent by reference to the following description and accompanying drawings which are given by way of illustration only, and thus are not limitative of the invention, and wherein:

FIG. 1A to FIG. 1C are the figures that show the prior art.

DETAILED DESCRIPTION OF THE INVENTION

The present invention will be apparent from the following detailed description, which proceeds with reference to the accompanying drawings, wherein the same references relate to the same elements.

Figure 2:
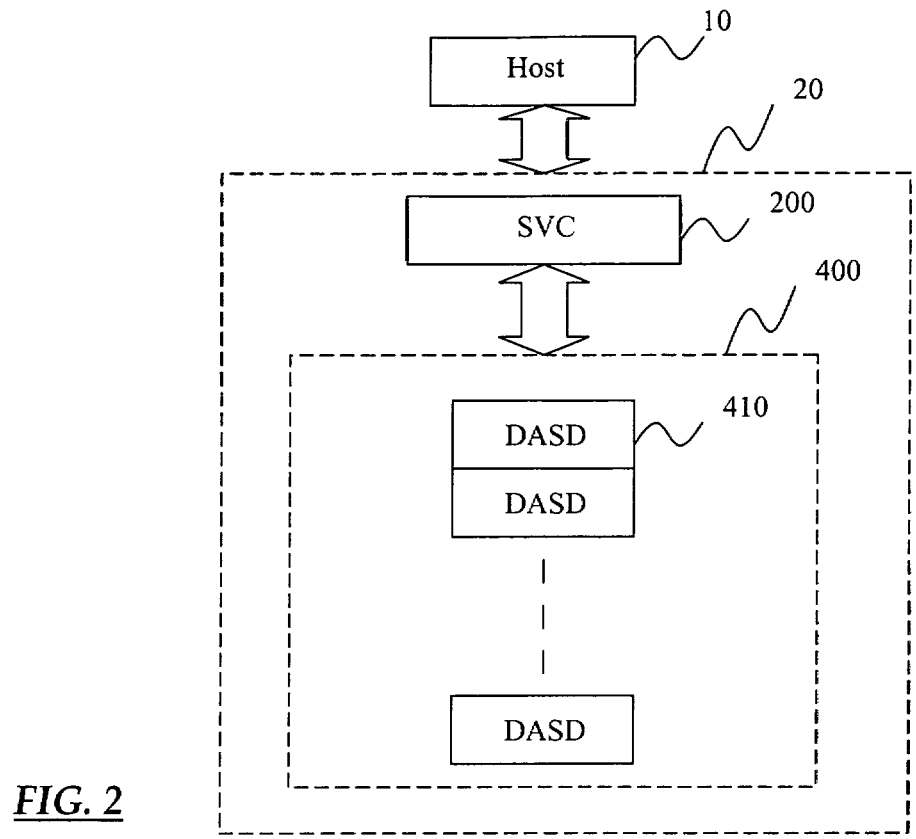
FIG. 2 is a block diagram showing the main structure according to an embodiment of the present invention.

FIG. 2 is a block diagram showing a block diagram of the main structure of an embodiment of the present invention, which includes a storage virtualization subsystem (SVS) and a storage virtualization controller (SVC). According to the present invention, the system of the present invention includes a host computer 10 and a storage virtualization subsystem 20 connected to the host computer 10. Although only one host computer 10 and only one storage virtualization subsystem 20 are shown in FIG. 2, there can be many storage virtualization subsystems 20 connected to the host computer 10, there can be many host computers 10 connected to the storage virtualization subsystem 20, or there can be many host computers 10 connected to many storage virtualization subsystems 20.

The host computer 10 can be a server system, a workstation, a personal computer system, or the like. Moreover, the host computer 10 can be another SVC. The storage virtualization subsystem 20 includes an SVC 200 which can be a disk array controller, a JBOD emulating controller or an array of direct access storage devices 400. Although here, only one array of direct access storage devices 400 is described, there can be many arrays of direct access storage devices 400 connected to the SVC 200.

The SVC 200 receives I/O request(s) and relating data (control signal and data signal) from the host computer 10, and internally executes the I/O request(s) or maps it to the array of the direct access storage devices 400. The array of the direct access storage devices 400 includes several direct access storage devices (DASDs) 420, such as hard disk drives.

Figure 16:
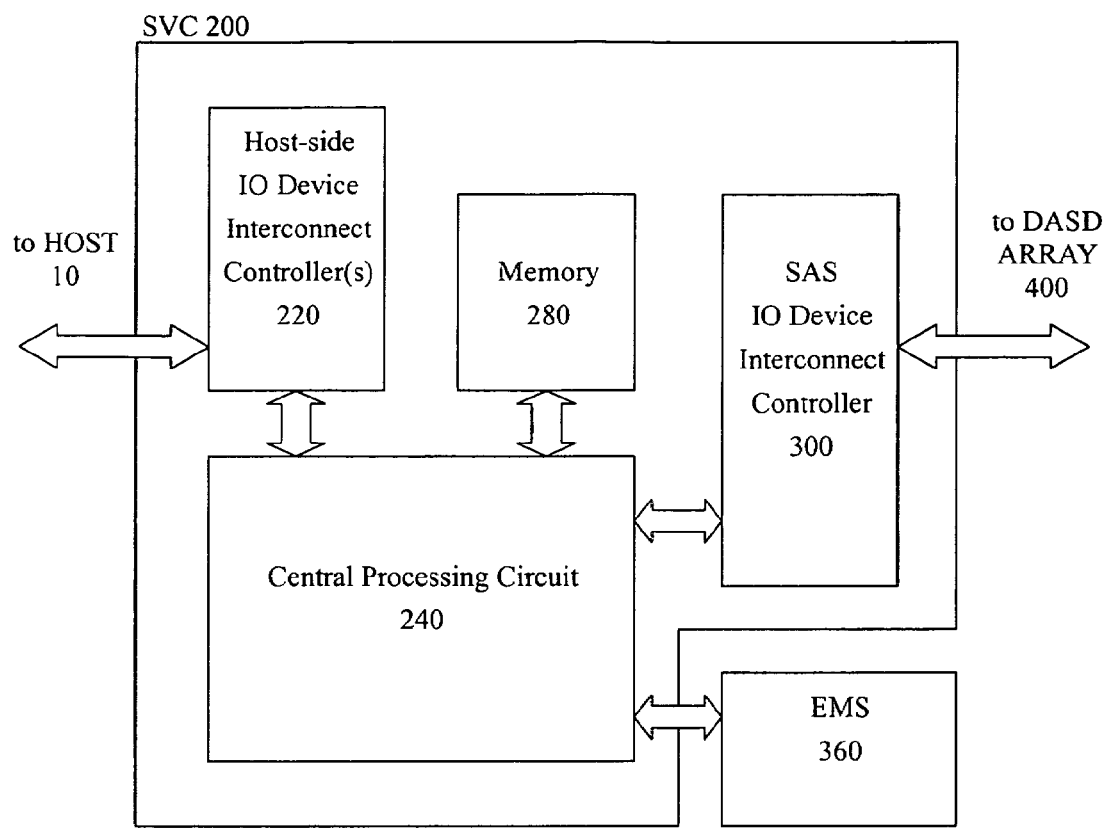
FIG. 16 is a block diagram of a first embodiment of an SVC 200 according to the present invention and the connection therefore to the host and the DASD array.

In one embodiment of the present invention, the SVC 200 is a serial attached SCSI SVC, i.e., the aforesaid SVC complies with the serial attached SCSI protocol. Please refer to FIG. 16. FIG. 16 is a block diagram showing a first embodiment of an SVC 200 according to the present invention and the connection thereof to the host and the DASD array. In this embodiment, the SVC 200 comprises a host-side IO device interconnect controller 220, a CPC (central processing circuitry) 240, a memory 280, and a SAS (Serial Attached SCSI) IO device interconnect controller (or the device-side IO device interconnect controller) 300. Although illustrated in separate functional blocks, two or more or even all of these functional blocks can be incorporated into to one chip in practical implementation.

The SAS IO device interconnect controller 300 is the device-side IO device interconnect controller connected to the CPC 240 and the DASD array 400. The SAS IO device interconnect controller 300 is an interface and buffer between the SVC 200 and the DASD array 400, and receives IO requests and related data issued from CPC 240 and map and/or transfer them to the DASD array 400.

The DASD array 400 can include serial attached SCSI DASD or serial advanced technology attachment (SATA) DASD or both.

Therefore, the present invention provides the storage virtualization computer system 400 having data Snapshot-Images management. The computer system 400 uses a kind I/O device interconnect controller (serial attached SCSI I/O device interconnect controller) that is installed in the SVC 200; thus, two different kind qualities and efficiencies of hard disk drives (serial attached SCSI hard disk drives and serial ATA (SATA) hard disk drives) can be used, so that the Source-Volumes are stored in a first kind of hard disk drive (serial attached SCSI disk drive), and the Snapshot-Images are stored in a second kind of hard disk drive (SATA disk drive); therefore, there is no need to use the same hard disk drive. Moreover, in the storage system, the Source-Volumes in storage space are frequently accessed. If using the higher quality hard disk drive for the Source-Volumes, then the availability of the data can be increased. On the other hand, the Snapshot-Images in storage space are storage backup and thus, not frequently accessed. If using the lower quality hard disk drive the Snapshot-Images, then the storage system will not be greatly affected, because in the same access frequency condition, quality of hard disk drive depends on service life of hard disk drive. Moreover, the Source-Volumes in storage space are usually used, and thus, the storage space is frequently accessed. Thus, if a higher efficient hard disk drive is used, then the performance of the storage system can be increased. On the other hand, the Snapshot-Volumes in storage space are storage backup, and thus, the storage space is not frequently accessed. Thus, if a lower efficient hard disk drive is used, then the performance of the storage system will be greatly affected. Because of different market positions of products, serial attached SCSI hard disk drive has a better quality and better efficiency (of course, its price is higher), while SATA hard disk drive has a poorer quality and poorer efficiency (of course, its price is lower).

Therefore, when in storage system having the snapshot function, using two different kinds of hard disk drives having two different kinds of qualities and/or efficiencies can reduce the cost with having little negative impact on the quality and/or performance of the storage system. If, however, the purpose of using two different kinds of hard disk drives can only be achieved by providing two kinds of interface controllers of different communication protocols in the SVC 200, the manufacture cost and system design cost will be greatly increased. Thus, in the embodiment of the present invention uses serial attached SCSI I/O device interconnect controller 300 as a device-side I/O device interconnect controller, can effectively achieve the purpose of using the hard disk drives of two different communication protocols via a single interface controller of a single communication protocol, and not greatly increasing the manufacture cost and system design cost.

Figure 17:
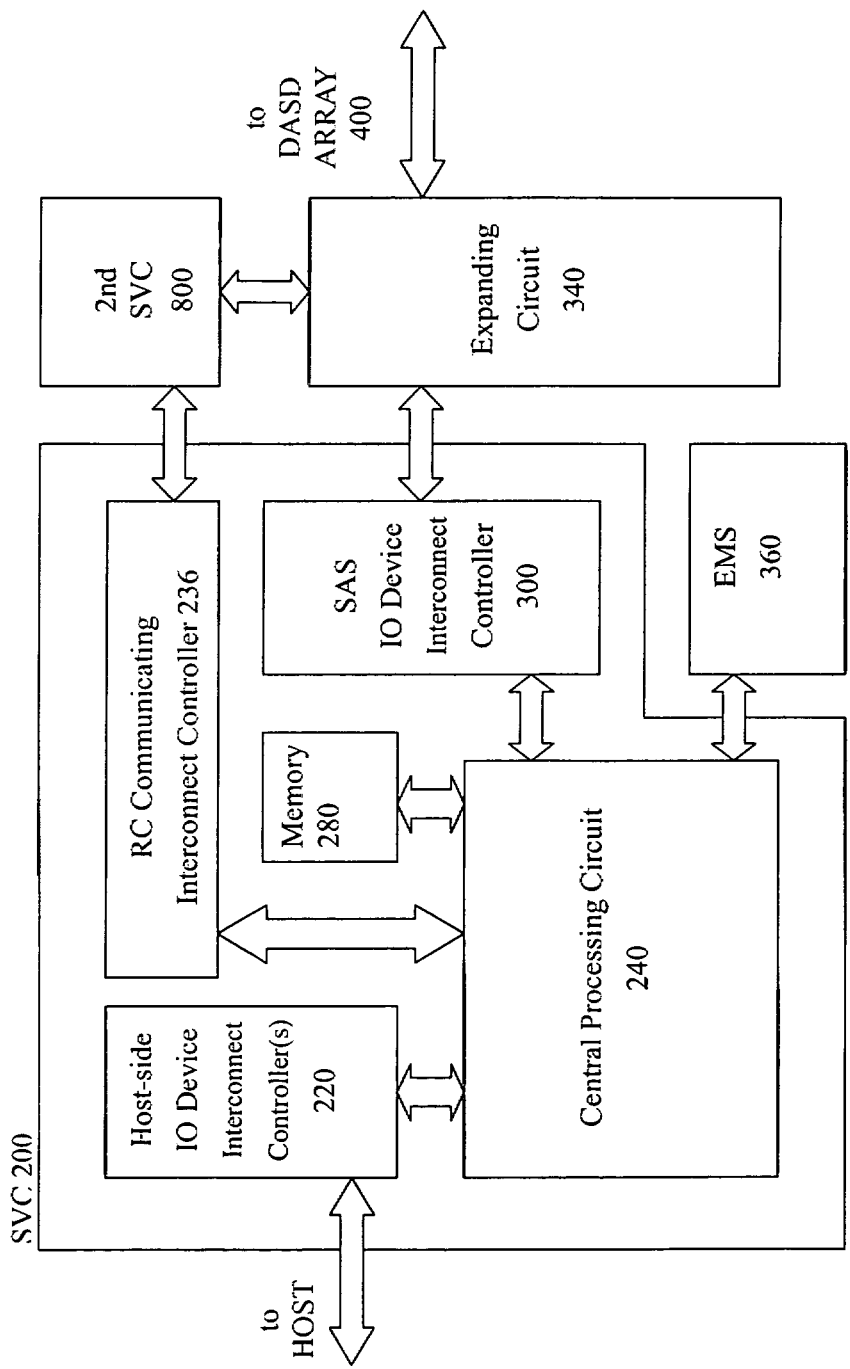
FIG. 17 is a block diagram of a first embodiment of an SVC 200 according to the present invention and the connection thereof to the host, a second SVC 800, and the DASD array.

In another embodiment, the storage virtualization subsystem is a redundant storage virtualization subsystem, please refer to FIG. 17. FIG. 17 is a block diagram showing a first embodiment of an SVC 200 according to the present invention and the connection thereof to the host, a second SVC 800, and the DASD array. In this embodiment, the SVC 200 comprises a host-side IO device interconnect controller 220, a CPC (central processing circuitry) 240, a memory 280, and a SAS (Serial Attached SCSI) IO device interconnect controller (or the device-side IO device interconnect controller) 300, and a redundant controller communicating (RCC) interconnect controller 236. Although illustrated in separate functional blocks, two or more or even all of these functional blocks can be incorporated into to one chip in practical implementation.

The RCC interconnect controller 236 is implemented in SVC 200 to connect the CPC 240 to a second SVC 800. In addition, the SAS IO device interconnect controller 300 is connected to the DASD array 400 through the expanding circuit 340.

In order to flexibly allocate and release media sections, the present invention adopts a section allocation system (SAS) for managing operations of the Snapshot-Volume.

Figure 3:
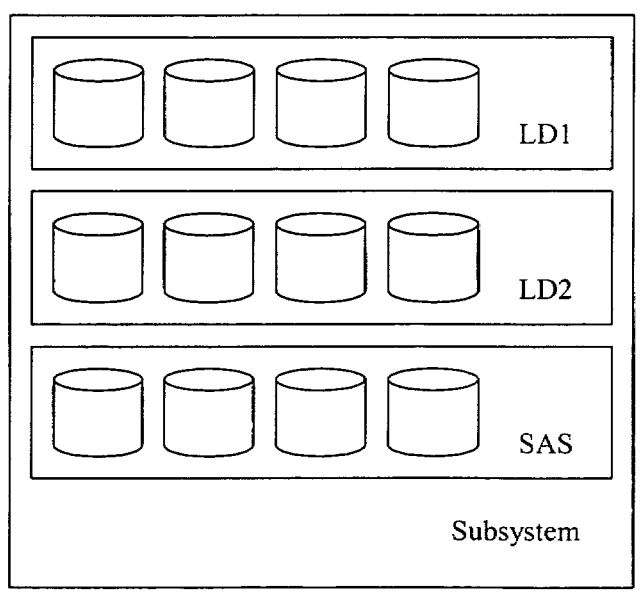
FIG. 3 is a figure which shows that the SAS is a file-system-like structure according to an embodiment of the present invention.

Please refer to FIG. 3, where the SAS is a file-system-like structure and can contain one or several media extent(s). These media extents are formed by formatting one or many logical volume disk(s)/partition(s) of the media section providers.

Figure 4A:
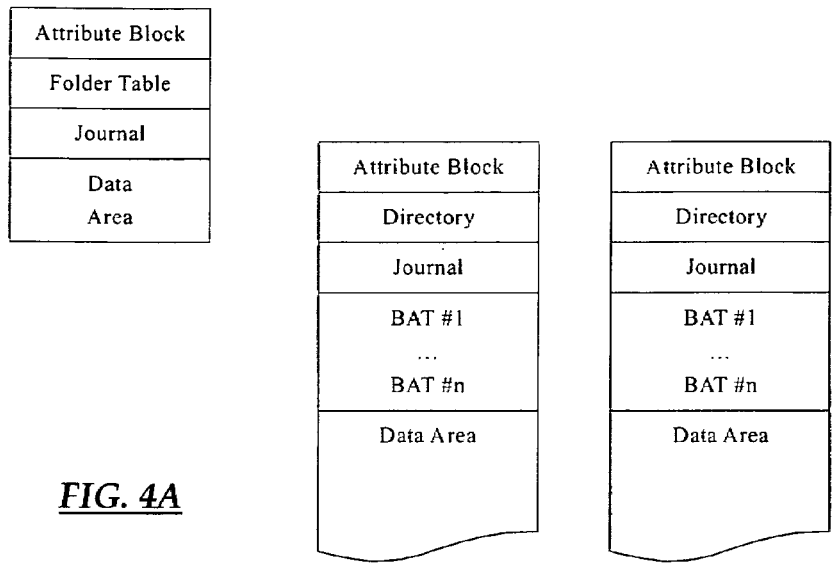
FIGS. 4A to 4B are figures which show that an embodiment structure of the SAS according to the present invention.
Figure 4B:
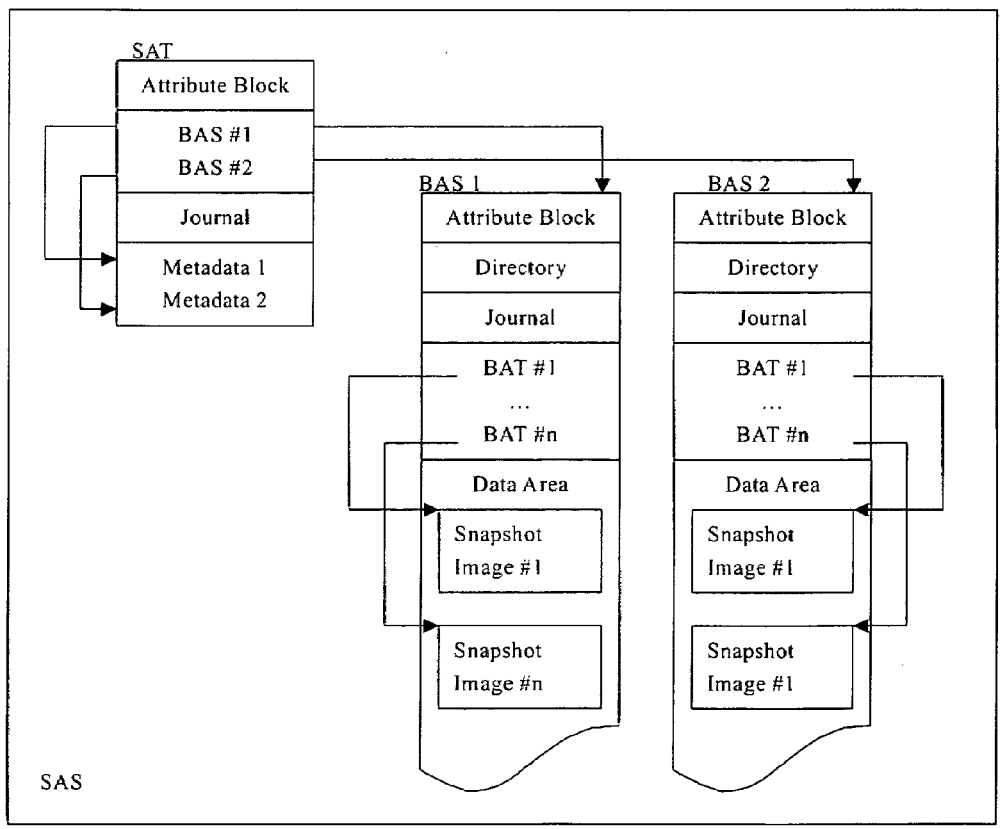

FIGS. 4A and 4B show an embodiment structure of the SAS, where each media extent contains its section allocation table (SAT) and an inode table (not shown). The inode table is used to store information on storage locations of the file contents, i.e., the file content pointers, so that the system can correctly retrieve the file contents via the inode. The SAS and each media extent thereof have a unique ID for identifying the object.

The SAS further contains one or many block association set(s) (BAS), and uses the BAS as the basis for performing point-in-time (PIT) backups, where each BAS contains a section list which here, is called the SAS file, and is also formatted into a file-system-like structure.

Block association tables (BAT) are stored in the BAS. The BATs are used to store cross-reference information in order to correspond to the backup data having the original storage address (i.e., logical block address, LBA). That is, each BAT stores the information on the corresponding PIT Snapshot Image to which it points. The backup data (Snapshot Image) is also stored in the BAS.

In the present embodiment, the SAT contains: an attribute block which records the SAS ID and the media extent ID; a folder table which records the information which points to each BAS and information on the Source-Volume which is associated with each BAS; a journal field which stores an operation journal for data recovery, in the event of system breakdown or power failure; and a metadata field which stores and manages the metadata of the SAT. The above-mentioned embodiment is implemented through using a journal-like file system; however, a person skilled in the art should be able to understand that the journal field is optional, not necessary, and can be omitted in other embodiments of the present invention.

Each BAS contains: an attribute block which stores information on the BAS ID, BAS size, and BAS-related settings; a directory field which stores BAT level and amount of established BAT; a journal field which stores operation journal for data recovery, in the event of system breakdown or power failure; a folder table which stores the BAT; and a data area which stores the snapshot images. As mentioned before, the journal field is optional, not necessary. Besides, the present embodiment adopts the design that has a control over total amount of the BAT; therefore, the directory field is provided to record the BAT level (i.e., the amount of the BAT, which can be established) to facilitate the control, but in other embodiments of the present invention, this field can be omitted. For example, the present invention has an embodiment which adopts the design that has a control over total amount of the BAS available (free) space.

Generally speaking, the first step of establishing the PIT backup of a logical media (e.g., LD/LV/Partition) is to establish an SAS on an independent available logical media. Next, the BAS is established, installed, and mapped to the ID(s)/LUN(s) of one or many host channel(s). Finally, at the moment when the PIT backup is performed, a corresponding BAT is established and is set as the active BAT in the BAS.

Figure 5A:
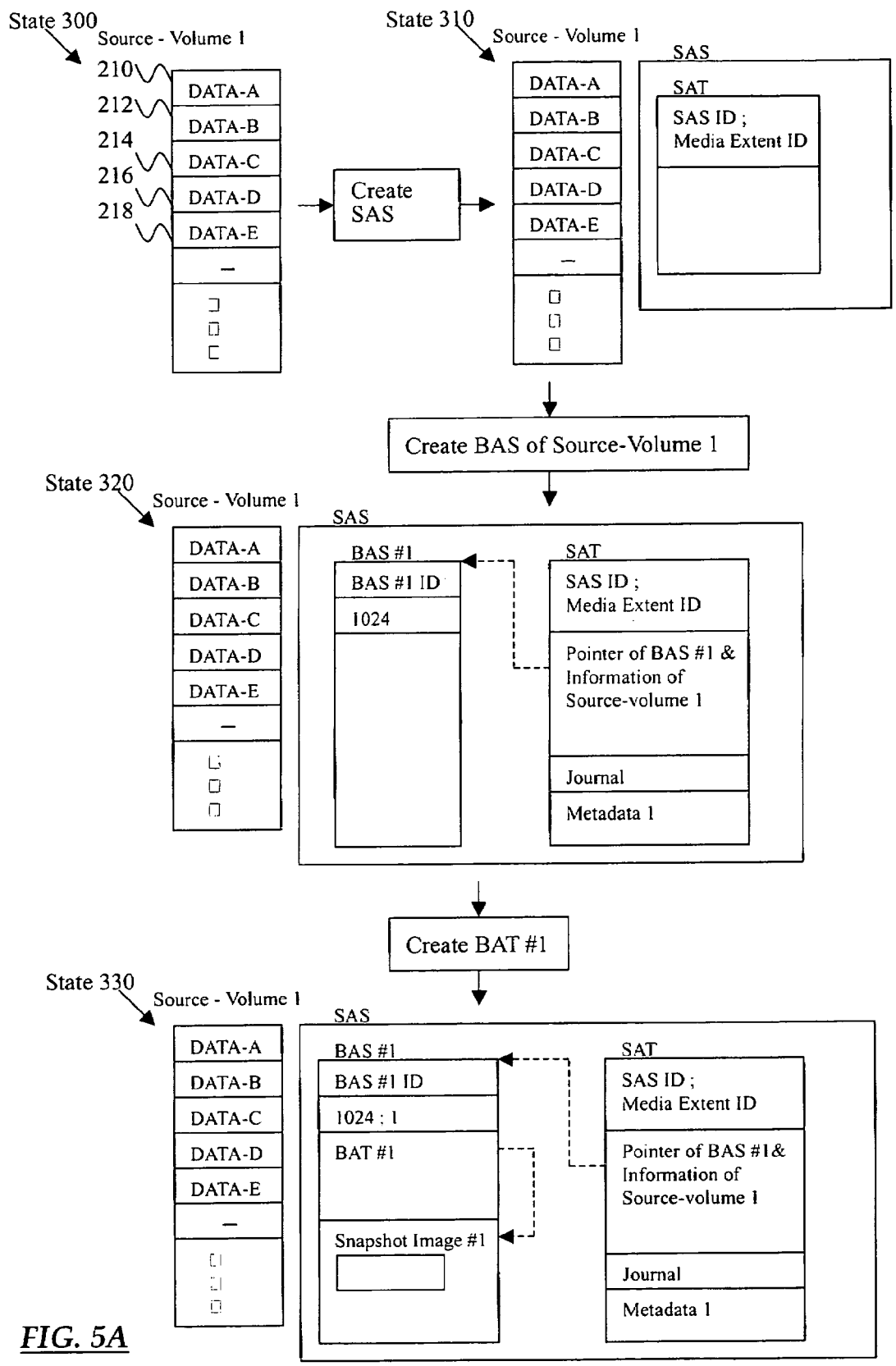
FIGS. 5A to 5D are figures which show that an example of performing the PIT backup according to an embodiment of the present invention.

Please refer to FIG. 5A which shows an example of performing the PIT backup according to the Source-Volume 1. The state 300 shows the Source-Volume 1. If the system is to perform the PIT backup according to the Source-Volume 1, first a SAS needs to be established; that is, an available media extent is registered for use by the SAS, as shown in state 310, where a SAT is established in the media extent, and the attribute block of the SAT stores the SAS ID and the media extent ID. Next, please refer to state 320, and the BAS#1 corresponding to the Source-Volume 1 is established, where the folder table of the SAT stores the information that points to the storage address of the BAS #1, and stores the information on the fact that the Source-Volume 1 corresponds to the BAS #1. Moreover, the attribute block of the BAS #1 stores the BAS #11D, and the directory stores the BAT level (here, 1024 is taken for an example in this embodiment). Next, in state 330, the BAT #1 is established, and a section of the data area is registered for use by the Snapshot Image #1. The BAT #1 is established in the folder table of the BAS #1, where the BAT #1 stores the information pointing to the storage address of the Snapshot Image #1, and stores the information on the time when the BAT #1 is established (i.e., information on the PIT backup time), and here the BAT #1 is set as the active BAT.

Figure 5B:
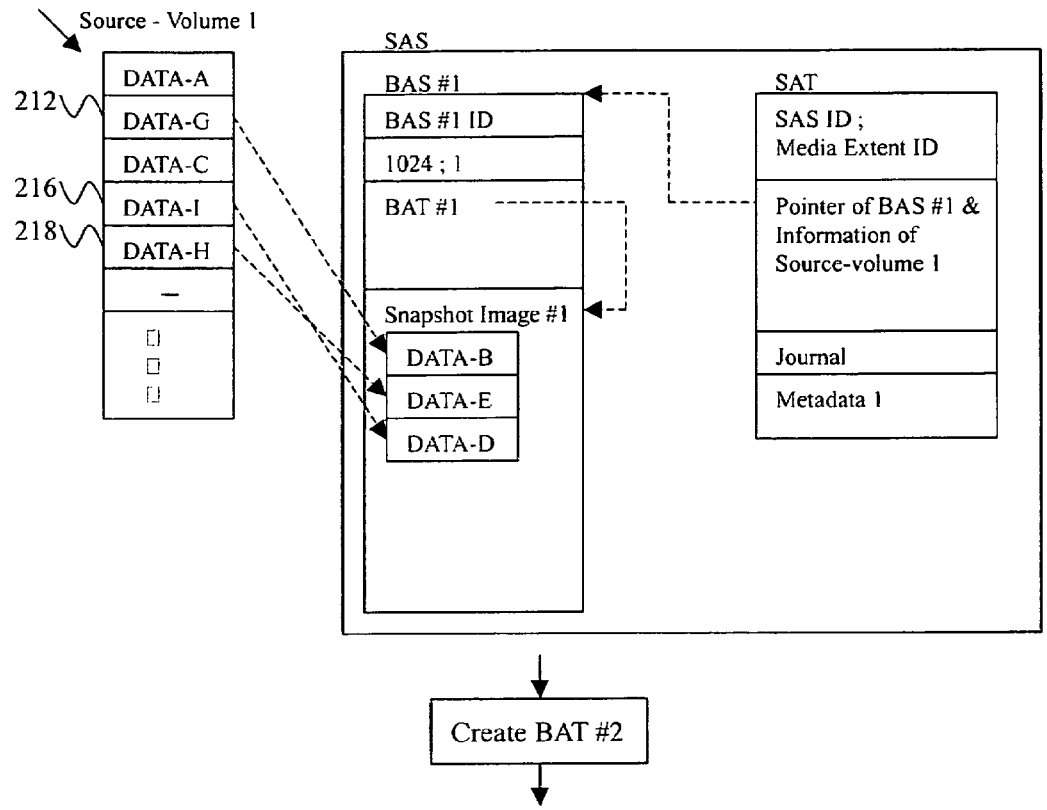
Figure 5B:
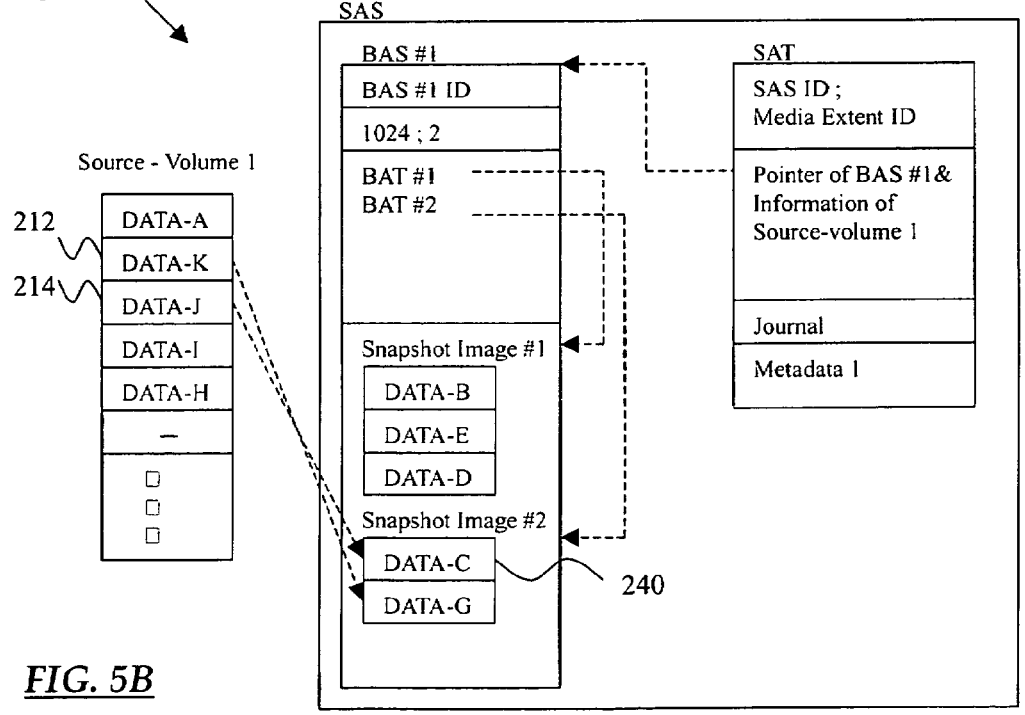

Please refer to FIG. 5B. If during the active period of the BAT #1, DATA-B, DATA-E and DATE-D in the data blocks 212, 218, 216 of the Source-Volume 1 are updated into DATA-G, DATA-H and DATD-I, then before the updating, a copy-on-write procedure is performed for the data originally stored in the data blocks. As shown in state 332, the data (DATA-B, DATA-E and DATE-D) and the information on corresponding logical block address (LBA) (not shown) of each data are first written into the Snapshot Image #1. During the writing, the Snapshot Image #1 can use the unused portion in the data area. That is, when the space that is registered to be used by the Snapshot Image #1 is insufficient, the unused (available) space inside the data area is to be added into the Snapshot Image #1 for data writing. Therefore, the Snapshot-Volume of the PIT backup consists of the data that are written into the Snapshot Image #1, and of the data blocks 210, 214 in the Source-Volume 1, where the data blocks 210, 214 are not performed with the copy-on-write procedure.

If a second PIT backup is generated according to the Source-Volume 1, then the BAT #2 must be established. That is, State 334 shows that after the BAT #2 is established, the data blocks 214, 212 of the Source-Volume 1 are updated. At that time, because the SAS has already existed, where the BAS#1 is served for the Source-Volume 1, there is no need to establish new SAS and BAS; Instead, a section in the data area of the BAS #1 is registered for use by the Snapshot Image #2, and the BAT #2 is established in the folder table of the BAS #1. The BAT #2 stores the information that points to the storage address of the Snapshot Image #2, and the information on the time when the BAT #2 is established (i.e., information on the PIT backup time). Afterwards, the BAT #1 is stopped, and the BAT #2 is set as the active BAT. That is, whenever any data in the Source-Volume 1 is updated, the performed copy-on-write procedure copies the original data into the Snapshot Image #2. As shown in state 334, take it for example that data blocks 214, 212 are updated to DATA-J and DATA-K. It should be noted that in this embodiment, the original data DATA-C inside the data block 214, where the original data DATA-C is first-time updated, does not need to be copied to the Snapshot Image #1. In this case, as far as the Source-Volume 1 is concerned, the Snapshot-Volume of the second PIT backup consists of the data written into the Snapshot Image #2 and of the data blocks 210, 216, and 218 in the Source-Volume 1, where the data blocks 210, 216 and 218 are not copied to the Snapshot Image #2. The Snapshot Image #1 of the first PIT backup contains all the data blocks in Snapshot Image #1 pointed by the BAT #1 and the data block 210 in the Source-Volume 1, where the data block 210 has not been performed with the copy-on-write procedure. Moreover, there may be data stored in the Source-Volume 1, where the data are not updated during service time of the BAT #1 but are updated during service time of the BAT #2, and thus are copied to the Snapshot Image #2 (e.g., the data block 214 is taken for example). Therefore, the Snapshot-Volume of the first PIT backup also contains the data block 240 in the Snapshot Image #2; that is, the Snapshot-Volume of the first PIT backup also contains the Data Block 240 in the Snapshot Images #2; in other words, in addition to containing all data blocks in the Snapshot Image #1 pointed by the BAT#1 and the data blocks in the Source-Volume, where the data blocks in the Source-Volume are not updated, the Snapshot-Volume of the first PIT backup can also contain partial data blocks or all data blocks in the Snapshot Image #2 pointed by the BAT #2, which means that it depends on how the data block(s) in the Source-Volume is (are) updated during the service time of the BAT#2.

From the above descriptions, it can be known that when a Source-Volume has more than one (e.g. "n" is taken for example) PIT backups that are established, each PIT backup has its corresponding BAT #m (1.m.n). However, in addition to the fact that Snapshot-Volume of PIT backup which corresponds to the active BAT #n only relates to Source-Volumes and the corresponding Snapshot Images #n, Snapshot-Volumes of other PIT backups relates to Source-Volumes, Snapshot Images of the corresponding BAT #m, and the Snapshot Images of the subsequently established BAT #m+1~n.

Figure 5C:
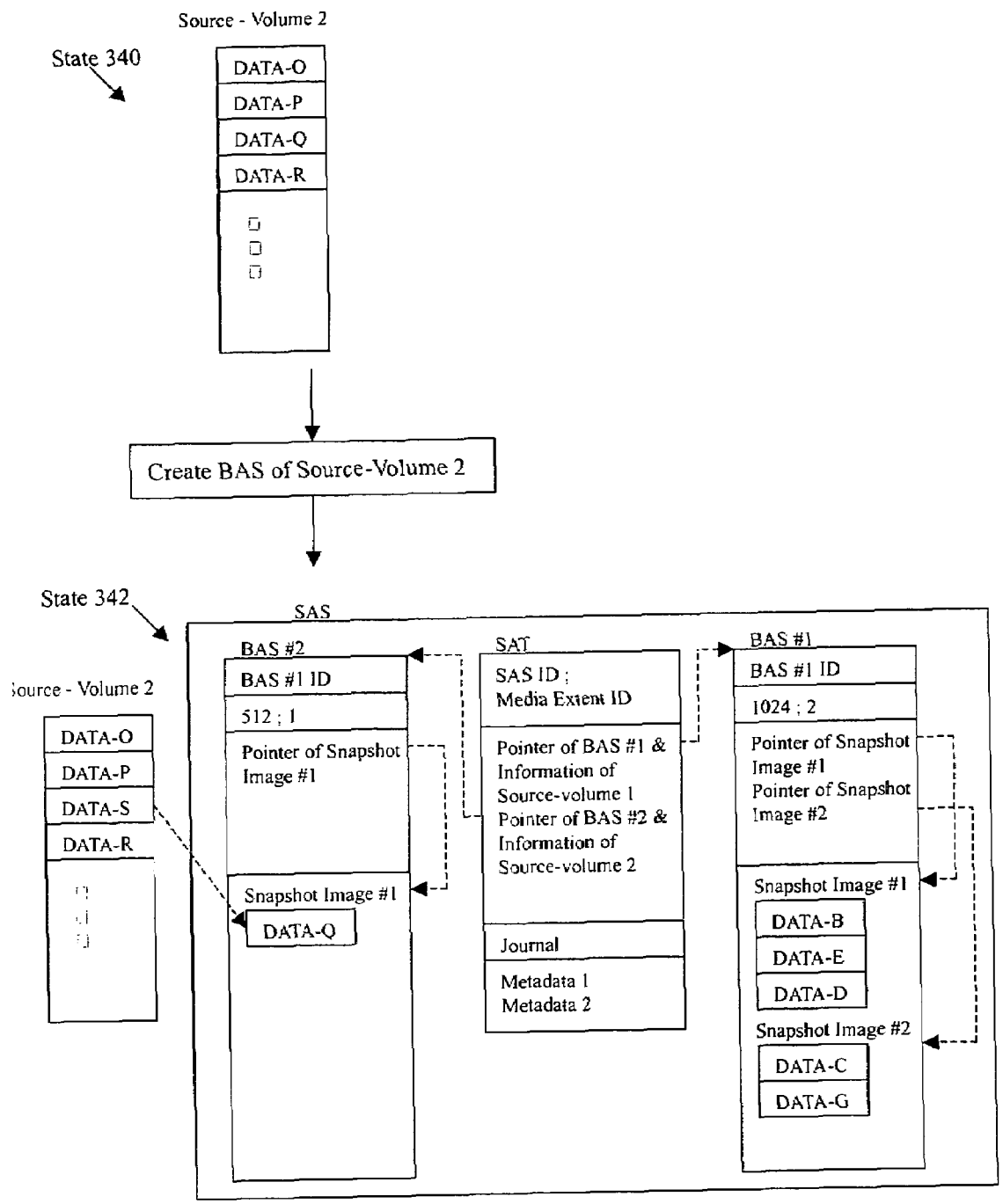

Please refer to FIG. 5C. If a volume manager is to perform a PIT backup according to the Source-Volume 2 (e.g., state 340), then because the SAS has been established at this moment, only the BAS #2 that corresponds to the Source-Volume 2 needs to be established. Please refer to state 342 again. First, the volume manager searches for available space inside the SAS and registers the free space for use by the BAS #2. The folder table in the SAT stores the information pointing to the storage address of the BAS #2, and stores the information on the Source-Volume 2 corresponding to the BAS #2. Moreover, the attribute block of the BAS #2 stores the BAS #2 ID, and the directory stores the BAT level (512 is taken for an example in the embodiment). Afterwards, the BAT #1 is established, and a block in the data area of the BAS #2 is registered for use by the Snapshot Image #1. The BAT #1 is established in the folder table of BAS #2, where the BAT #1 stores the information pointing to the storage address of the Snapshot Image #1, and stores the information on the time when the BAT #1 is established (i.e., information on the PIT backup time), and here the BAT #1 is set as the active BAT.

From the aforesaid description, in this embodiment, each Source-Volume has its corresponding BAS, and the pointer stored in the SAT is used to point to the BAS. Snapshot Images of each PIT backup of the Source-Volume are stored in the corresponding BAS. Next, Each BAS has a corresponding BAT for each PIT backup, where the BAT is used to point to the Snapshot Image. During the copy-on-write procedure, the data only need to be written into the Snapshot Image currently pointed by the active BAT, and do not need to be copied into other Snapshot Images that have already been established, which means that the space for storing Snapshot Images and the copy-on-write procedure can be effectively reduced.

Figure 6:
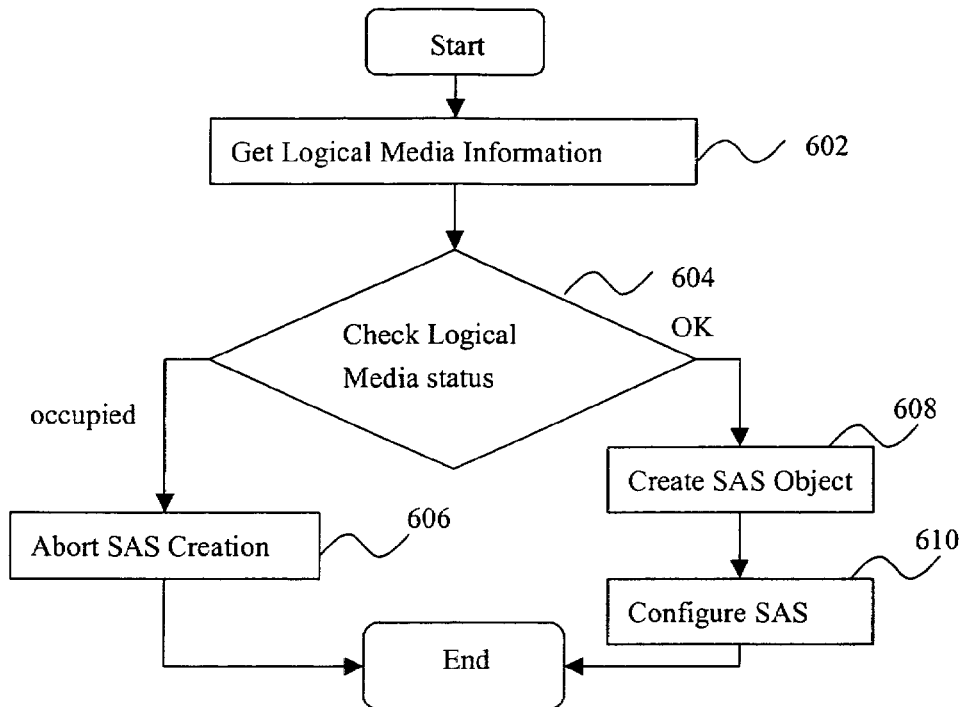
FIG. 6 is a flowchart, showing the steps of establishing the SAS according to an embodiment of the present invention.

After describing the SAS structure, how to achieve the procedure of establishing the SAT is now further described. First of all, as mentioned before, the first step of establishing the PIT backup of a logical media is to establish a SAS on an independent available logical media. In addition, in practice, the system may first start the snapshot function to stand by before the system needs to perform the PIT backup for some specific logical media. However, once the snapshot function is initiated (probably after receiving the start command from the host or from the monitoring unit or due to some reasons of the controller itself), the volume manager immediately establishes the SAS. Please refer to FIG. 6 which is a flowchart of an embodiment, showing the steps of establishing the SAS. After the mechanism of establishing the SAS is initiated, the information on the logical media that is connected to the controller and is accessible by the controller, is first obtained, and the status of the logical media is checked in order to find available storage space for performing snapshots (steps 602 and 604). If there is no available storage space, then the establishing procedure is stopped. (step 606). If the initiation is activated by the host or the monitoring unit, then a failure message is returned back to the host or the monitoring unit. If there is available storage space, then the SAS object is established (step 608); that is, one or several available logical volume drives/partitions of the media section provider are formatted in order to form the media extents, and each of the media extents is marked for use by the snapshots. A SAT is further established in the media extent. The SAS ID and the media extent ID are stored in the attribute block of the SAT. Finally, the SAS is allocated (step 610).

In one embodiment of the present invention, the SAS storage space is allowed to be extended, so that when the original storage space for the SAS is insufficient, user is allowed to start the extension mechanism. Please refer to FIG. 7 which is similar to FIG. 6. First, the information on the logical media that is connected to the controller and that is accessibly by the controller, is first obtained, and the status of the logical media is checked (steps 702 and 704) in order to find available storage space. If there is no available storage space, then the extension is stopped (step 706), and a failure message is generated to notify the user. On the other hand, if there is available storage space, then the SAS object is extended (step 708); that is, the available logical volume drive/partition is formatted in order to establish a media extent, and the media extent for use of the extension is registered for use by the SAS. The SAT that corresponds to the media extent is established in the media extent, and the SAS ID and the newly extended media extent ID for use of the extension are stored in the attribute block. The inode table of the former media extent points to the newly established media extent. Finally, the SAS is allocated (step 710). Because in this embodiment, different media extents exist on different logical volumes, in consideration of the system operation efficiency, each media extent has its own SAT. However, any person skilled in the art should understand that in other embodiments of the present invention, the SAS containing many media extents can have only one SAT. Although the user starts the extension mechanism in this embodiment, it should be understood that the present invention is not limited to this example. The system can automatically start the extension mechanism under some critical conditions. The following will describe an example, where the extension mechanism is performed.

Figure 8:
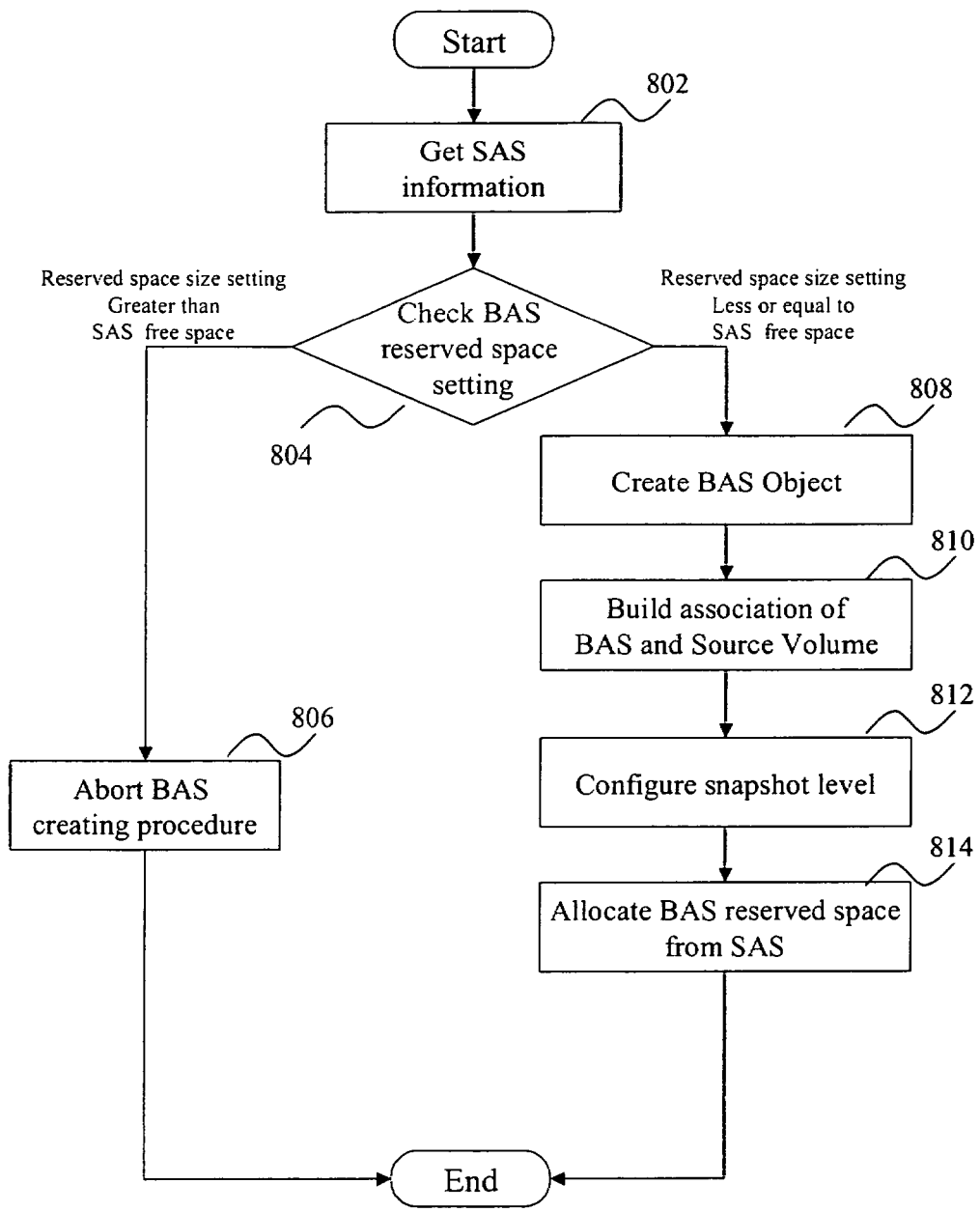
FIG. 8 is a flowchart of an embodiment, showing the steps of establishing the BAS according an embodiment of the present invention.

Please refer to FIG. 8 which is a flowchart of an embodiment of establishing the BAS. When performing a snapshot according to a Source-Volume, the volume manager first establishes the BAS corresponding to the Source-Volume. That is, first, the SAS information is obtained (step 802). Next, the reserved space settings of the BAS is checked (step 804). If the reserved space size of the BAS is set to be greater than the current free space of the SAS, then the BAS cannot be established, and thus, the establishing procedure is stopped (step 806). On the other hand, if the reserved space size of the BAS is smaller than the current free space of the SAS, then there is enough free space in the SAS for the BAS to use; therefore, the BAS object is established (step 808). Afterwards, the association between the BAS and the Source-Volume is established (step 810). The folder table of the SAT of the existing media extent that corresponds to the BAS is added with the information that points to such a BAS, and with information on the fact that the Source-Volume corresponds to such a BAS, thereby establishing the association among the Source-Volume, the SAT, and the BAS. Afterwards, the snapshot level is allocated (step 812), which is stored in the directory of the BAS according to the BAT level of the Source-Volume, set up by the user. The free space of the SAS is then assigned for use by the reserved space of the BAS (step 814). Then the establishing the BAS is achieved.

However, as described before, if the BAT level is not necessary in other embodiments, then step 812 can be omitted in the embodiments.

Figure 7:
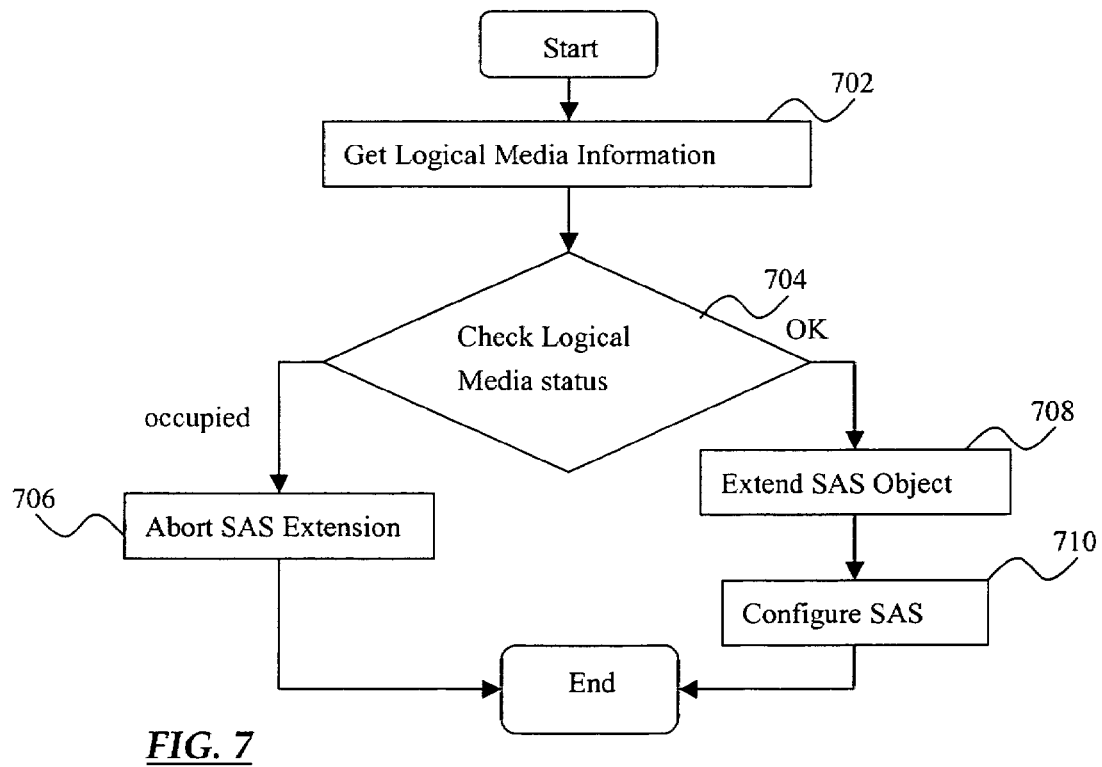
FIG. 7 is a flowchart of an embodiment, showing the steps of extending the SAS according to an embodiment of the present invention.

In an embodiment in which the system supports the SAS automatic extension mechanism, a procedure of extending the SAS available space (as shown in FIG. 7) is executed before the aforesaid procedure of stopping establishment of the BAS (step 806). The procedure of extending the SAS available space is executed in order to search for other free spaces that are unallocated to the SAS, and making the free space used by the SAS. If there is no free space found for the SAS extension during the automatic extension procedure, step 806 is executed to stop establishing the BAS. Otherwise, once the SAS is extended, the procedure of establishing the BAS goes back to step 802 in order to re-obtain the SAS information, and to compare the reserved space size of the BAS with the SAS free space (step 804).

In the aforesaid embodiments, the reserved space size of the BAS is designed to at least include the space required by the fields except the data area. When establishing the BAS, the space is divided according to requirements of the fields of the BAS, and each is reserved for exclusive use by each field of the BAS, but it is preferred to include some storage spaces of the data area. In the embodiments in which the BAT level is included, when establishing the BAS, the basic space required by each BAT and by the corresponding Snapshot-Image are reserved according to the setting of the BAT level.

Because in the aforesaid embodiments, the established BAS only requests to reserve size of the reserved space, when performing the copy-on-write procedure for the PIT backup, use status of the reserved space is checked. If the originally reserved of the BAS is insufficient, then at that time, the free space in the SAS is searched and is combined into the BAS rather than each BAS first occupies a large and fixed storage space at the very beginning. Through using this method, the storage space occupied by each BAS is determined according to actual operation, and thus, the space allocation of the entire SAS is more flexible and efficient.

However, if it is taken into consideration that one or some BAS(s) may occupy (occupies) too much space in the SAS, so that no free space is available for other BASs to perform the PIT backup (for example, at the time when PIT backups are mass produced according to some Source-Volumes, or when a lot of copy-on-write procedures are performed.), then in an embodiment of the present invention, a threshold for the space of the BAS is set. Before performing the copy-on-write procedures, used space of the BAS is first checked. If the used space of the BAS reaches or exceeds the threshold, then the volume manager processes according to the settings by the user or the system. For example, a warning signal is sent out, or former Snapshot Images are deleted in order to free some space, or to make the BAS fail. The aforesaid thresholds can be many different thresholds in order to distinguish different levels of used space of the BAS, where the many different thresholds correspond to different warning signals or different dispositions. Moreover, the above-mentioned thresholds can be space units, e.g. 200 GB, 300 GB, or the above-mentioned thresholds can be a ratio to the SAS space, e.g. 20%, which means that the threshold is BAS/SAS=20%. Relating descriptions are given hereinbelow.

Figure 9A:
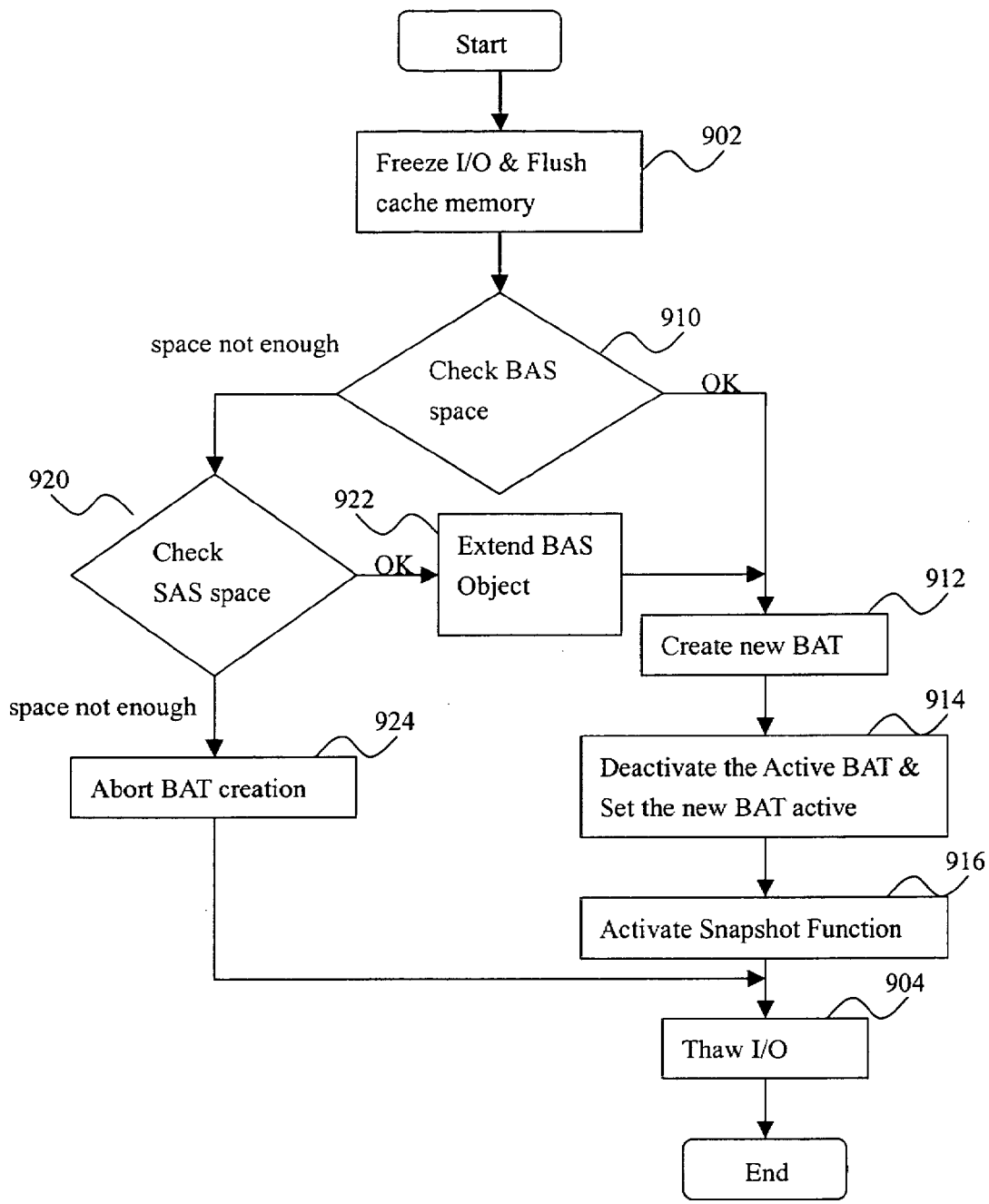
FIGS. 9A to 9D are the flowcharts that show the steps of establishing a BAT according to different embodiments of the present invention.

Finally, when reaching a moment when the PIT backup is performed according to a specific Source-Volume, a corresponding BAT should be established and is set as the active BAT in the BAS. FIG. 9A shows the flowchart of establishing a BAT according to one embodiment of the present invention. First, in step 902, all I/Os relating to the specific Source-Volume are frozen, and operations relating to the Source-Volume stored in the cache memory are first completed and cleared. In step 910, the free space in the BAS is checked to determine whether there is enough free space to establish the BAT and the corresponding Snapshot Image. If the free space is sufficient, then a new BAT is established in the folder table of the BAS and a section of the data area is registered for use by the Snapshot Image of the new BAT (step 912). Next, the active BAT is stopped, and the newly established BAT is set as the active BAT (step 914), and the snapshot function is then initiated (step 916), followed by step 904. In step 904, the originally frozen I/Os are unfrozen. If the free space of the BAS is insufficient, then the usage status of the space of the SAS is checked (step 920). When there is free space, a section of the free space is combined with the BAS (step 922), followed by step 912. If the SAS does not have sufficient free space, then the procedure for establishing the BAT is stopped (step 924) and the corresponding procedure (such as sending a warning signal to notify the user or manager) is initialized. Step 904 follows to unfreeze the originally frozen I/O.

Figure 9B:
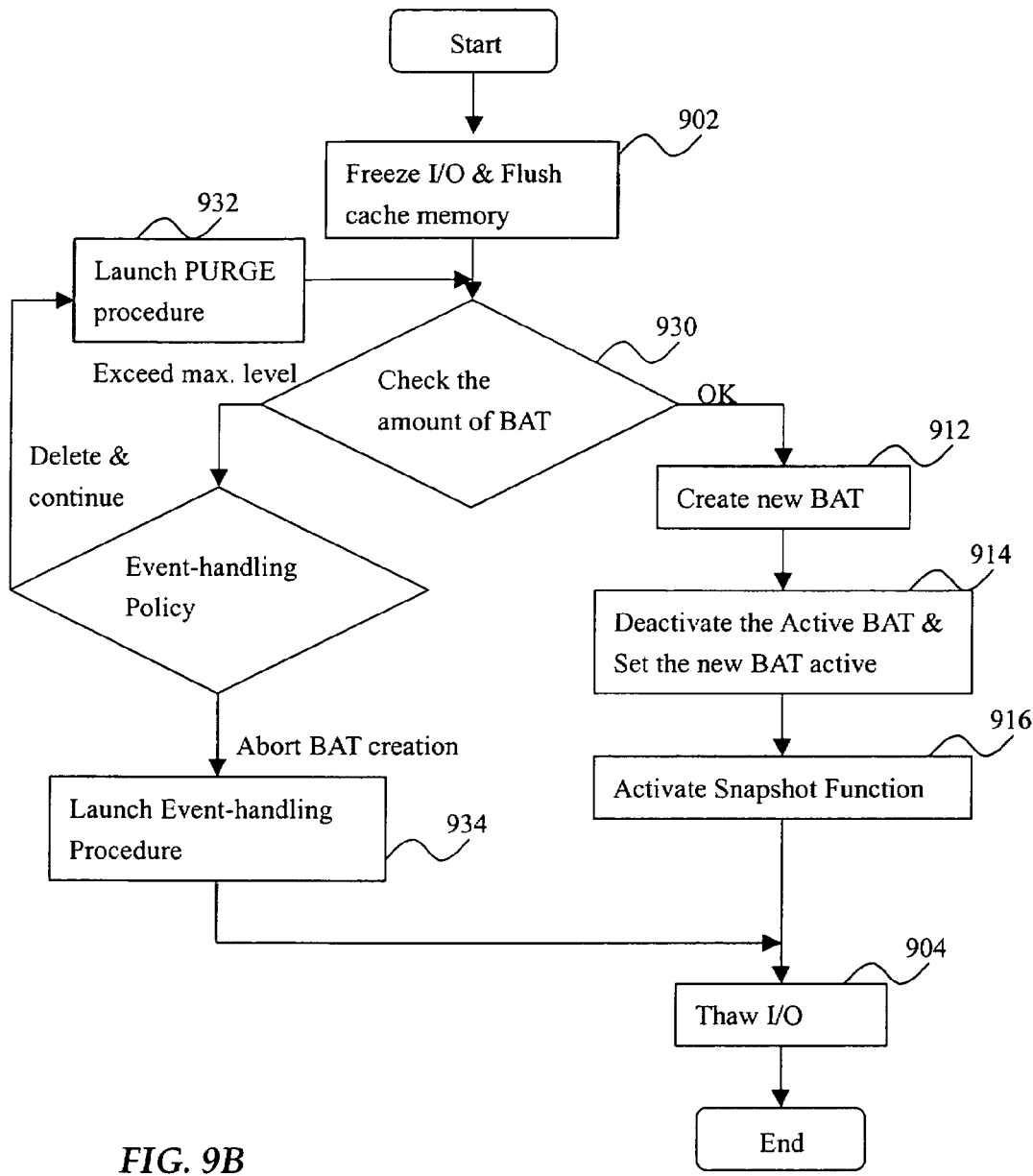

As described above, a BAT level is set in one embodiment of the present invention. When establishing the BAS for the BAT, the basic space required by folder table and the basic space required by each corresponding Snapshot Image are reserved according to the settings of the BAT. Please refer to FIG. 9B which is a flowchart of this embodiment, and shows the procedure for establishing the BAT. In comparison with FIG. 9A, the difference between FIG. 9A and FIG. 9B is that after the step 902, the step 910 is replaced by step 930; that is, the step 30 is to check the amount of the established BAT in the corresponding the BAS in order to compare to the set level. If the amount of the established BAT does not reach the setting of the BAS level, then go to the step 912, where a new BAT is created. On the other hand, if the amount of the established BAT reaches the BAS level, then actions are taken according to an event-handling policy. In this embodiment, two event-handling policies are proposed for the user to choose. One policy is step 932, where a purge procedure is started to delete some existing PIT snapshots, so that the storage space of the corresponding BAT and Snapshot-Images can be freed for re-use, and the details will be described hereinbelow. The other policy is step 934, where the establishment of the BAT is stopped, and the corresponding procedure (such as sending out a warning signal to notify the user or manager) is started, followed by step 904. Although here, only two event-handling policies are taken for an example and can be set by the user in the present invention, in the embodiments of the present invention, the system is configured that only one of the policies is performed.

Figure 9C:
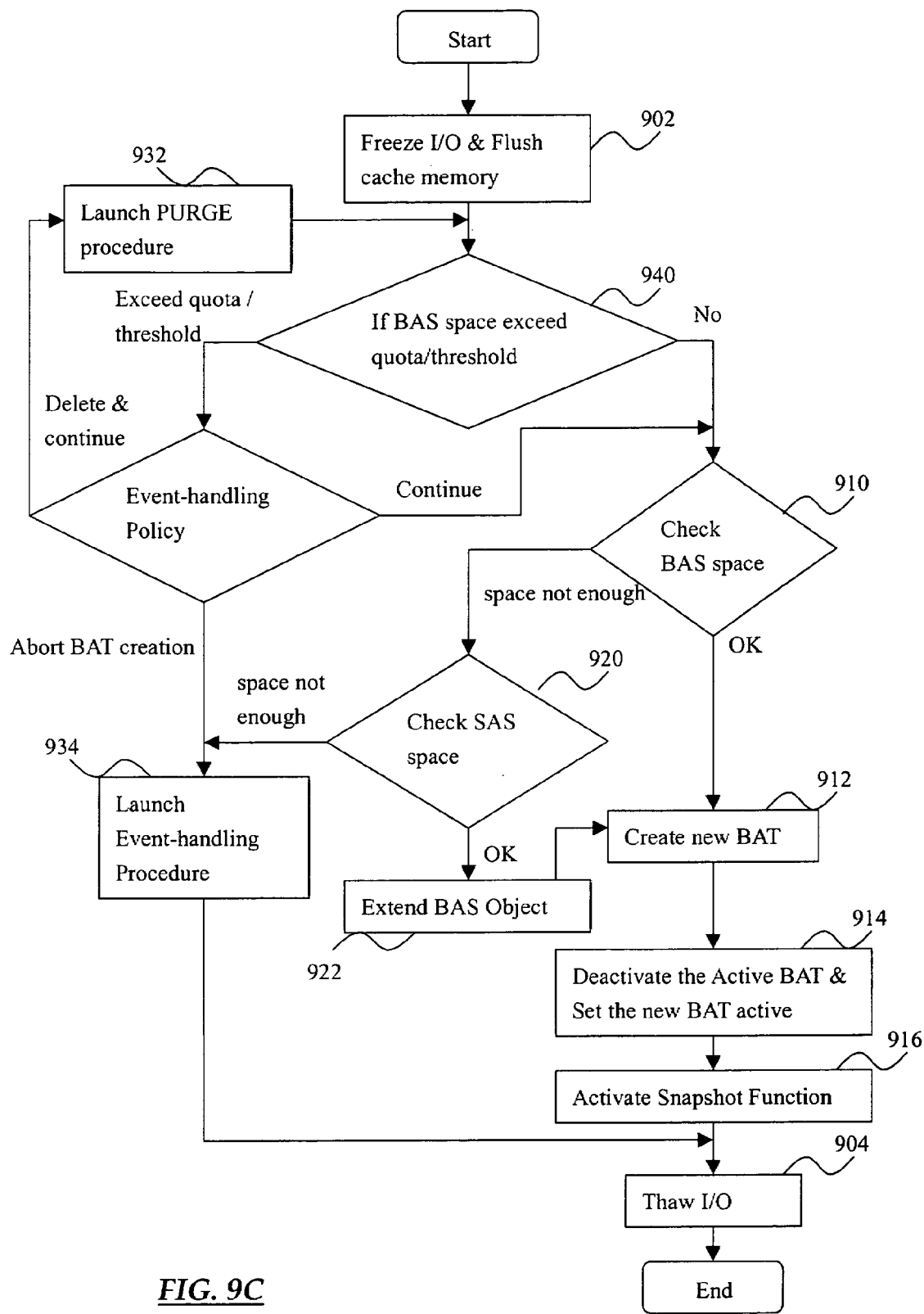

Now, please refer to FIG. 9C which is a flowchart of the embodiment, and shows the procedure for establishing the BAT, where the at least one threshold for used space is set based on the space used by the BAS. Compared with the FIG. 9A, the difference between FIGS. 9A and 9C is that the step 940 is inserted between the step 902 for freezing and the step 910, for checking the BAS space, and is used to check whether the space used by the BAS (non-free space) has reached or has exceeded the threshold (step 940). If the threshold is not reached, the procedure goes to step 910 and is the same as FIG. 9A. After the step 910, the rest of the steps are the same as those of the FIG. 9A, and thus, the detailed descriptions are omitted here. If the threshold is reached or exceeded in step 940, a warning signal is sent out to notify the user that the space used by the BAS has reached the threshold. Next, actions are taken according to the event-handling policy. In this embodiment, three event-handling policies are provided for the user to choose, where two of the three event-handling policies are the same as those of FIG. 9B; that is, one is the step 932 for starting the purge procedure, and the other is the step 934 for stopping the establishment of the BAT and for starting the corresponding procedure to notify the user or manager; moreover, the third event-handling policy is to continue establishing the new BAT, followed by the step 912. This is because the threshold in the third event-handling policy may be defined only for the purpose of reminding the user. In an embodiment having many thresholds, the user can set different policies that correspond to different thresholds. For example, the set first threshold is BAS/SAS=20%, and the set second threshold is 40%, where the set first threshold corresponds to the third policy, and the set second threshold corresponds to the first policy.

Figure 9D:
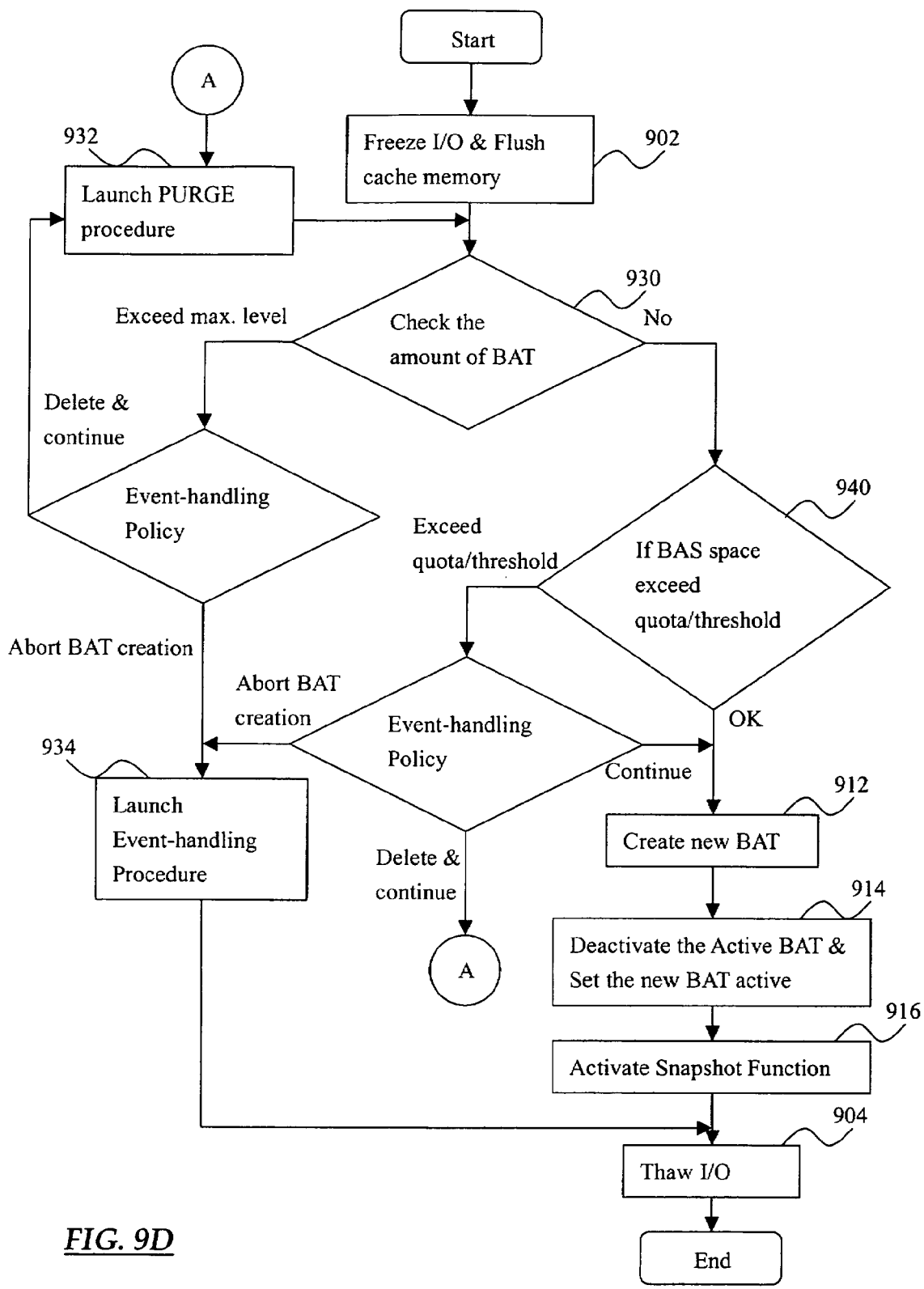

In addition to the flowchart shown in FIG. 9C, FIG. 9D shows an embodiment that at the same time, sets the BAT level and reserves in advance basic space required for establishing each BAT. Similar to FIG. 9B, the step 902 of freezing the I/O is followed by first checking the amount of BAT in order to compare to the BAT level (step 930). If insufficient, then the procedure goes to the step 932 or the step 934 according to the event-handling policy. On the other hand, if sufficient, then the step 940 is performed. If the set threshold is reached or exceeded, the step 932, step 934, or step 912 is taken according to the event-handling policy. Moreover, the procedure directly goes to step 912 if the threshold is not reached.

Figure 10:
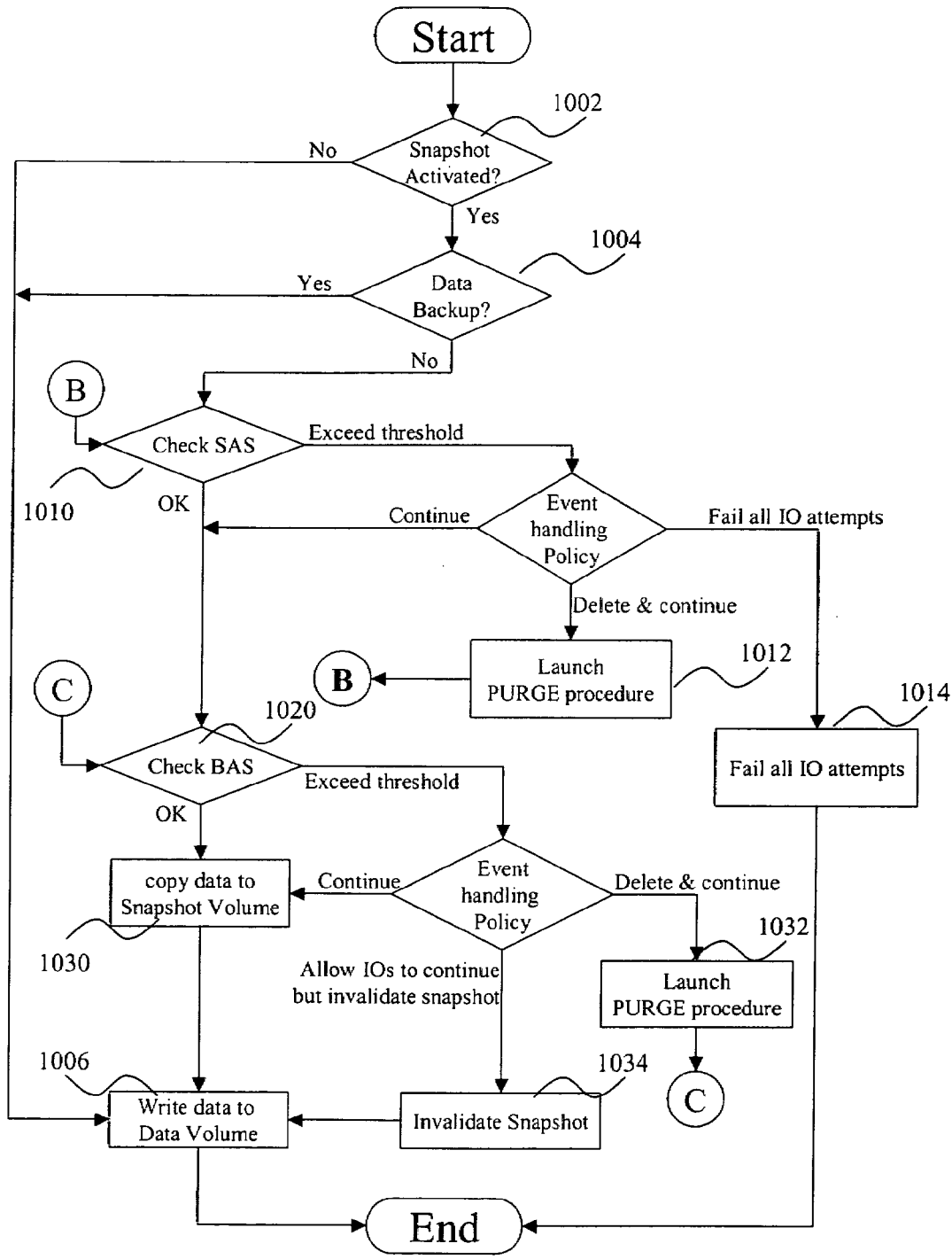
FIG. 10 is a flowchart that shows the steps of setting a threshold for the used space according to an embodiment of the present invention.

Finally, please refer to FIG. 10. In this embodiment, at least one threshold is set for the space used by the SAS and the BAS, respectively. When the controller receives an instruction (usually from the host), the controller first interprets the instruction. If the instruction is a write-in instruction, then the controller operates according to FIG. 10; that is, first, the controller checks whether the snapshot function is activated (step 1002). If not, the data are written into the data volume (step 1006). If the snapshot function is activated, then it checks whether the data block(s) to be written has (have)

already been performed with the copy-on-write procedure and is (are) copied to the Snapshot Image of the active BAT (step 1004). If copied, then go to the step 1006. If the target data block(s) has (have) not been performed with the copy-on-write procedure, then the status of space used by the SAS is checked (step 1010) to see if threshold is reached. The step 1020 is taken if the threshold is not reached. If the threshold has been reached or exceeded, a warning signal is sent out to notify the user that the space used by the SAS has reached the threshold. Next, actions are taken according to the event-handling policies. In this embodiment, the three event-handling policies are provided for the user to choose, where the first one is the step 1012 that starts a purge procedure, the second event-handling policy is the step 1014 that invalidates all I/O operation(s), and the third event-handling policy is that after sending out a warning signal, go to the step 1020. The step 1020 checks the status of the space used by the BAS; that is, compared with the set threshold, if the status of the space used by the BAS does not reach the threshold, then the step 1030 is taken, where the copy-on-write is performed, and thus copies the data originally stored in the data block(s), into the active Snapshot-Image of the BAS. When the threshold is reached, a warning signal is sent out, and actions are taken according to the event-handling policies, where the first one is to start the purge procedure (step 1032), the second event-handling policy is to allow I/O operations but invalidate the snapshot function of the BAS (step 1034), and the third event-handling policy is to send out the warning signal and is followed by the step 1030. After the copy-on-write procedure (step 1030), step 1006 is taken to write the data to be written, into the target data blocks.

Figure 11A:
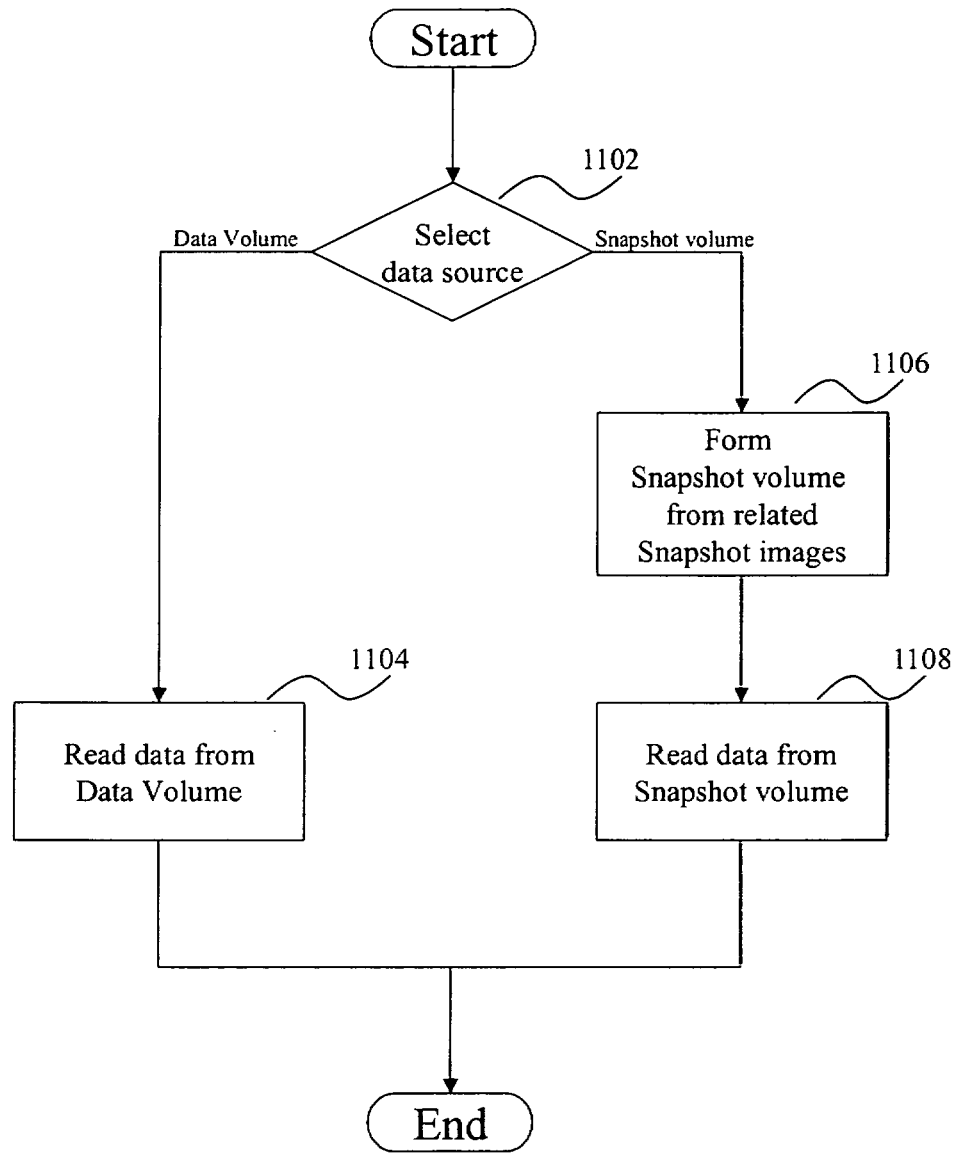
FIG. 11A is a flowchart that shows the steps of performing a read instruction according to an embodiment of the present invention.
Figure 11B:
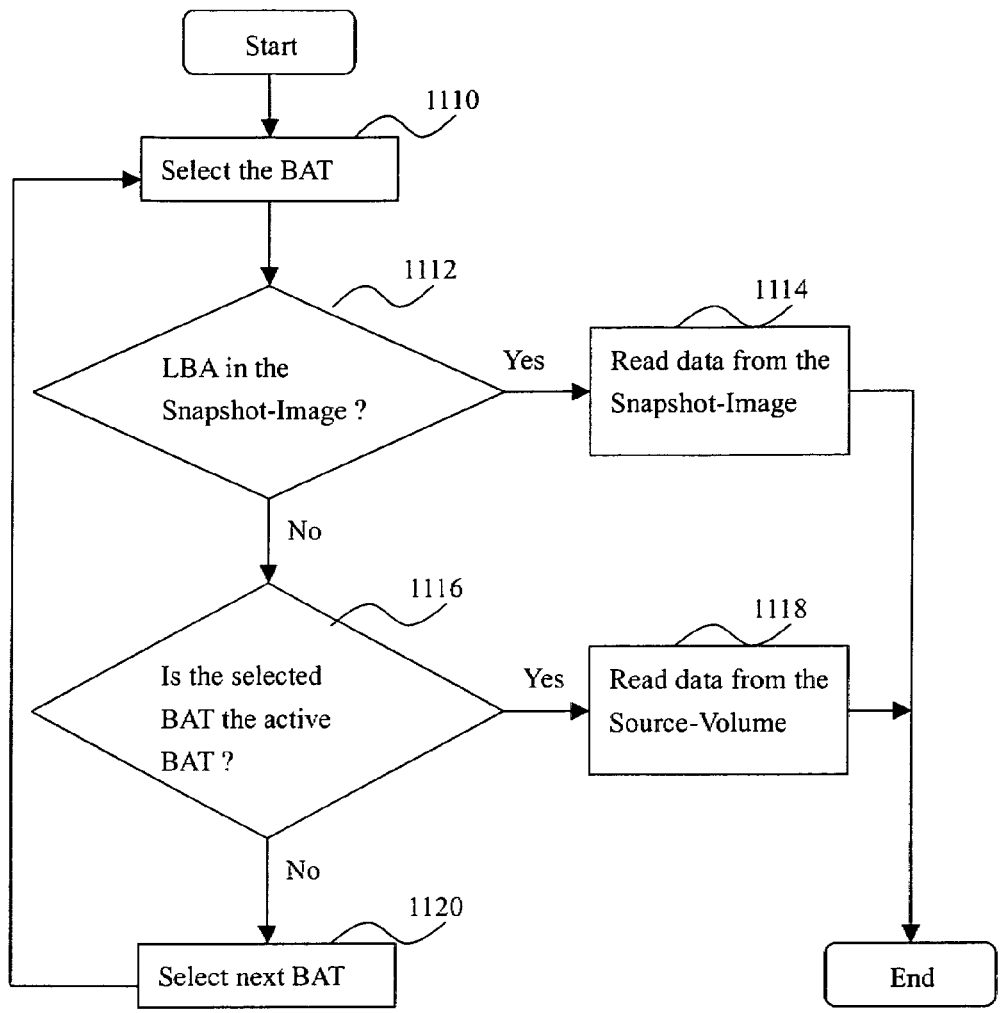
FIG. 11B is a flowchart that shows the steps of performing a read instruction according to an embodiment of the present invention.

If it is a read instruction, please refer to FIG. 11A. First, the controller analyzes whether the target to be read is the Data-Volume or a Snapshot-Volume (step 1102). If the Data-Volume is the target, then data are read out directly from the Data-Volume (step 1104). If the Snapshot-Volume is the target, then the relating Snapshot-Images are used to form the Snapshot-Volume. Next, data are then read out from the Snapshot-Volume (steps 1106 and 1108).

As mentioned before, because in addition to including the Snapshot-Image #m and the Source-Volume at the moment, each Snapshot-Volume #m may further include part or all of the subsequently established Snapshot-Image(s), in one embodiment of the present invention, the aforesaid steps 1106 and 1108 *d* can be as follows. First, the corresponding BAT in the corresponding the BAS is selected according to the moment when is selected by the user (step 1110). For each data block to be read, the system first checks whether LBA of each data block exists in the Snapshot-Image that corresponds to the BAT (step 1112); in other words, it is checked whether the copy-on-write procedure has been performed, and that data in the data blocks are copied into the Snapshot-Image during the copy-on-write procedure. If yes, then the corresponding data are read from the Snapshot-Image (step 1114). If not, then the system checks whether the BAT is the active BAT of the BAS (step 1116). If the BAT is the active BAT, then data are read from the corresponding Source-Volume (step 1118). If the BAT is not the active BAT, then the BAT at the next moment is selected (step 1120). The above-mentioned steps are repeated until all the data have been read out.

As far as setting the PIT backup times, in an embodiment of the present invention, the setting can be started manually by the user or according to a schedule (e.g., 1:00 AM every day, every Monday, every first day of each month, etc) that is set by the user. When reaching the schedule, the volume manager automatically establishes the PIT backups. Besides, there may be several schedules with priorities so that if the space is insufficient, and the purge procedure has to be performed, then the schedules with lower priorities can be first deleted accordingly.

Figure 12:
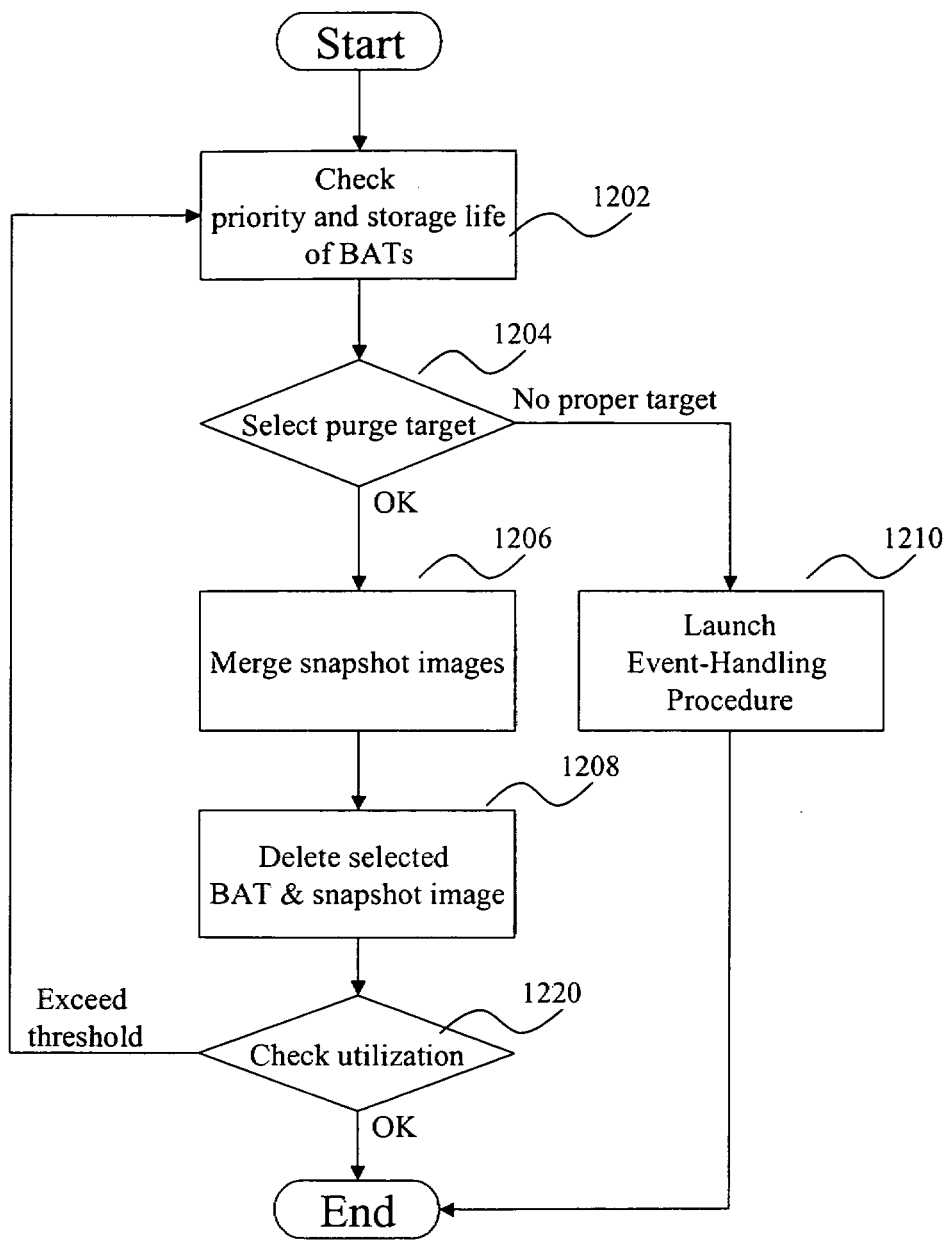
FIG. 12 is a flowchart that shows the steps of performing a purge procedure according to an embodiment of the present invention.

Here, we further describe the purge procedure. The purge procedure is used mainly to delete some of the existing PIT snapshots when the space is insufficient to use, so that the storage space used by the corresponding BAT(s) and the corresponding Snapshot-Image(s) can be freed for re-use. Please refer to FIG. 12 which is the flowchart of an embodiment. First, the priority and the valid storage life of each BAT are checked (step 1202). A BAT with an expired storage life and the lowest priority is first selected as the target to be deleted (step 1204). If there is no appropriate target, then the corresponding event-handling policy is started (step 1210). Generally speaking, a warning signal is sent to notify the user or manager, and the corresponding main procedure is stopped. For example, in the purge procedure of FIGS. 9B~9D, the establishment of the BAT is stopped. On the other hand, during the purge procedure of FIG. 10A, the I/O operations are invalidated. If there exists a purge target, then the relating Snapshot Images are merged first (step 1206). Afterwards, the selected BAT and Snapshot Image are deleted (step 1208). The system checks whether or not available space is sufficient (step 1220). If not, then go to step 1202 until the space is sufficient. In other embodiments of the present invention, step 1220 can be omitted, and after the purge procedure is done, go to the step of checking the condition of starting the purge procedure (as shown in FIGS. 9B~9D and FIG. 10).

In the present embodiment, each BAT is set with a priority and a valid storage life. In step 1204, these two factors (the priority and valid storage life) are taken into consideration when selecting a purge target to be deleted. First, the BATs with valid storage lives are reserved. On the other hand, the BATs with expired storage lives are deleted according to their priorities, where the BAT with the lowest priority is first deleted. Besides, the considerations in step 1206 are taken into consideration because each of the Snapshot-Volumes in the present invention may relate to the subsequently established Snapshot-Image(s). Because in this embodiment, the deletion is started according to the priority, the one that is deleted may not be the earliest one. Therefore, if deleted directly, the previous Snapshot-Volume may have errors. For example, in FIG. 5B, if the BAT #2 and Snapshot-Image #2 are directly deleted, then the Snapshot-Volume-1 corresponding to the BAT #1 will have errors, which is caused by the fact that DATA-C in the original data storage block 214 of the Snapshot-Volume-1 is lost. Therefore, such a procedure is required to merge the information on the original data block 214 and DATA-C stored in the Snapshot-Image #2, into the Snapshot-Image #1 before the deletion step 1208 is performed. Of course, in addition to the aforesaid embodiment, in other embodiments, only one of the factors (e.g. the priority) needs to be taken into consideration, or in one embodiment of the present invention, the deletion is always started with the earliest BAT and Snapshot-Image, until the space is enough. In this case, the aforesaid merge step 1206 can be omitted.

To enable the SAS space to be more efficiently used, an embodiment of the present invention is provided with a prune mechanism. Data are set with valid storage lives, so that only those Snapshot-Volumes with valid storage lives are reserved. This prune mechanism can be periodically started by the system to prevent old data or too many data from occupying the storage space.

Figure 13:
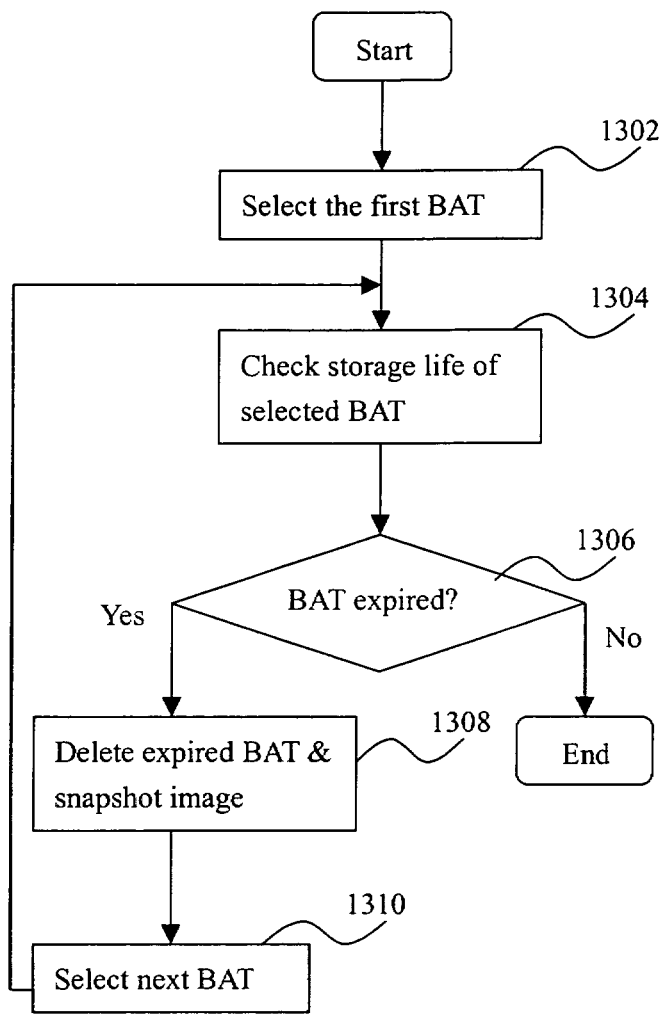
FIG. 13 is a flowchart that shows the steps of performing a prune mechanism according to an embodiment of the present invention.

As to the prune mechanism, please refer to FIG. 13. First, the earliest BAT with valid storage life is selected (step 1302).

The valid storage life of the selected BAT is checked and is compared with the valid date (step 1304) in order to understand whether or not the selected BAT has expired (step 1306). If expired, the selected BAT and the corresponding Snapshot-Image(s) are deleted (step 1308). Next, the BAT at the next moment is selected (step 1310). Step 1304 is repeated until the selected BAT has a valid storage life (non-expired).

The above-mentioned valid storage life takes a period for an example for purpose of explanation. However, in other embodiments of the present invention, the valid storage life can be the amount of the BATs. That is, it is set that only a certain amounts of newly established BATs are reserved, and that all the earlier BATs and the corresponding Snapshot-Image(s), where the earlier BATs and the corresponding Snapshot-Image(s) exceed the certain amounts, are all deleted. This variation can be readily accomplished by a person with basic knowledge of the field following the spirit of the present invention. Therefore, it is not further described herein.

Figure 14:
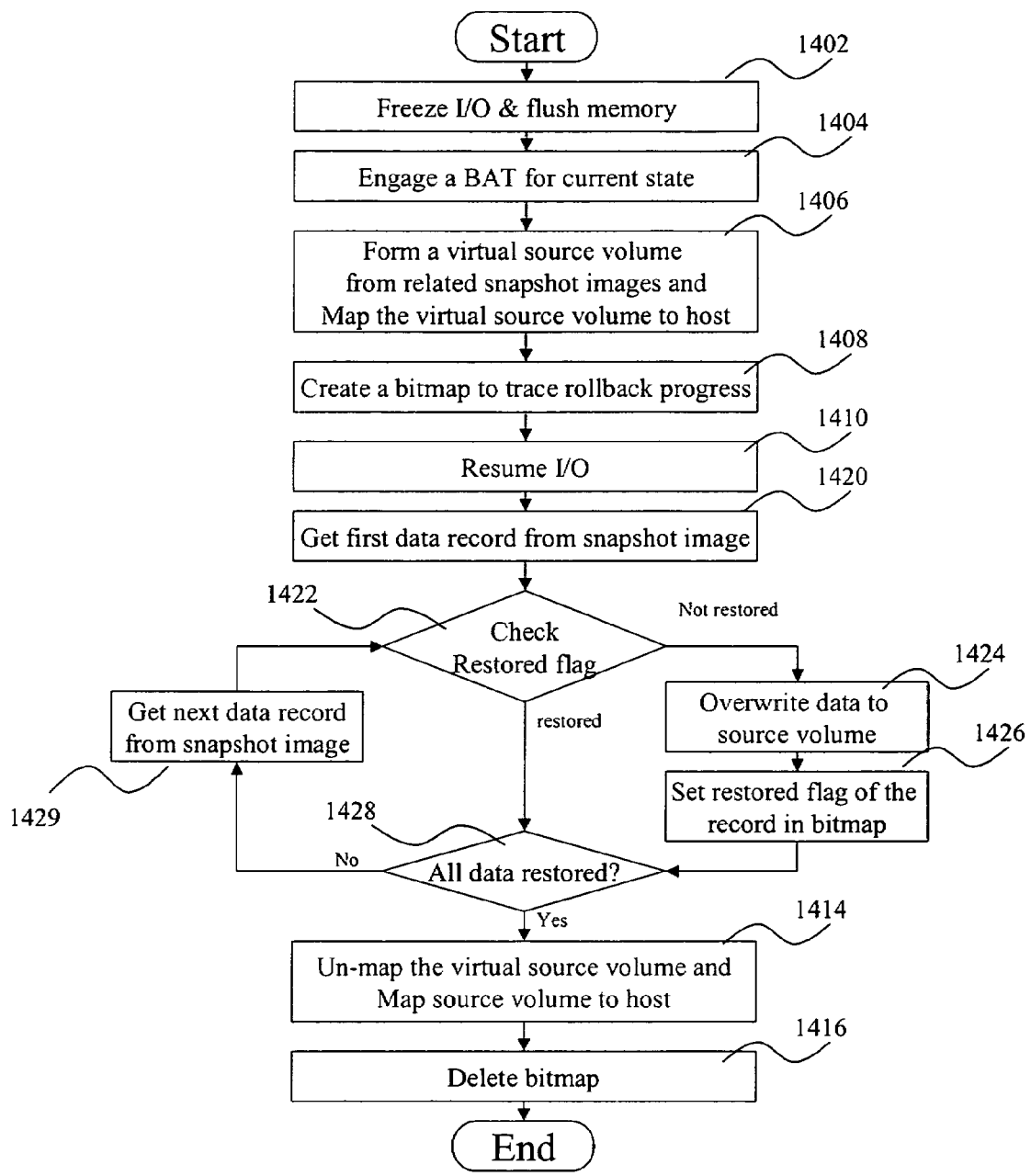
FIG. 14 is a flowchart that shows the steps of performing a rollback process according to an embodiment of the present invention.

It has been described before that the snapshot technique is employed to store the status of the Source-Volume at a particular moment. One purpose of using the snapshot is for the system to recover the Source-Volume data back to the particular moment when any problem or error occur to the data. That is, the system has the rollback function. FIG. 14 illustrates the flowchart of a rollback embodiment of the present invention. Please refer to FIG. 5D, where the relating SAS and SAT are not shown for the purpose of clearer illustration; instead, only the relating Source-Volume and BAS are shown.

Figure 5D:
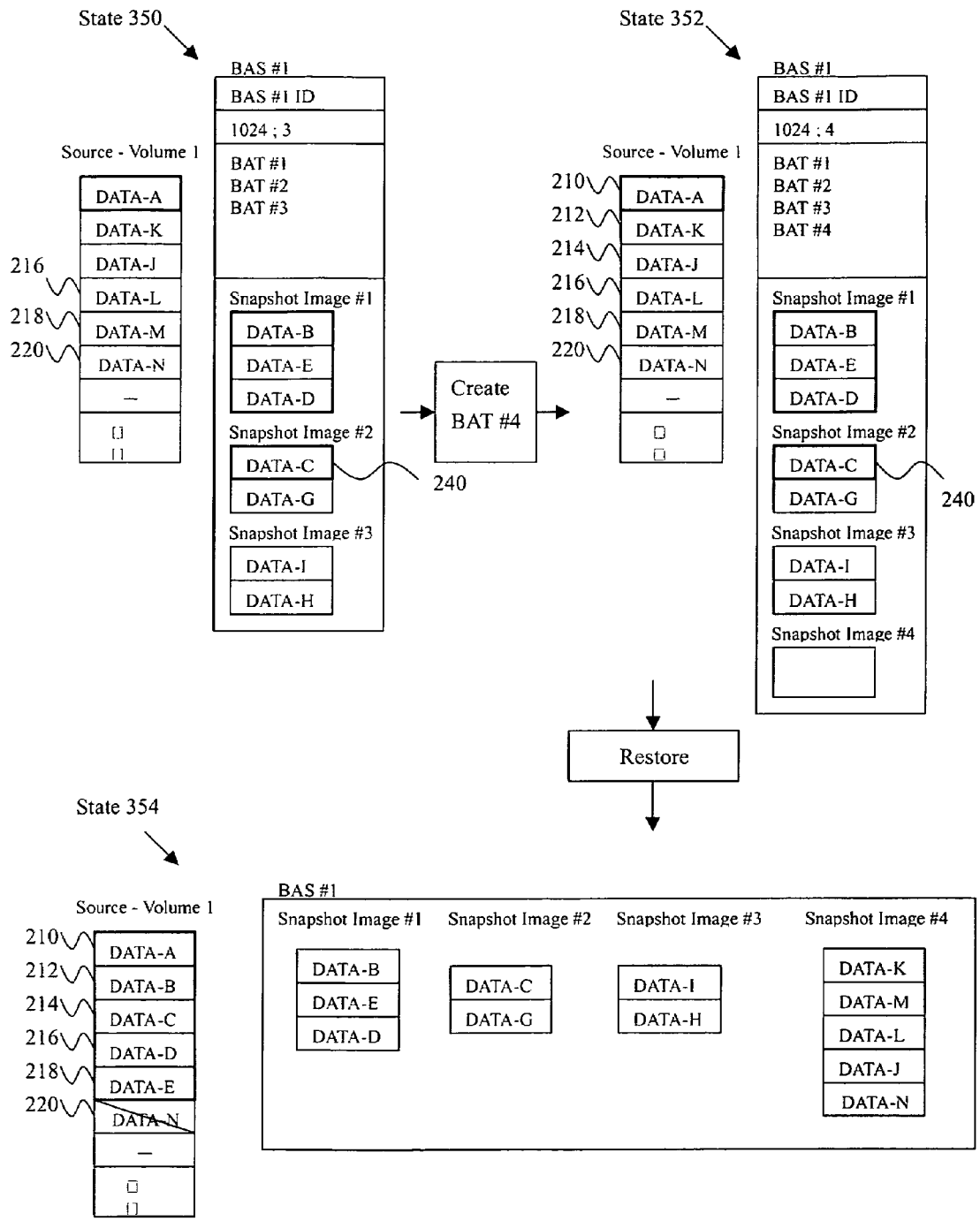

State 350 in FIG. 5D shows the state of the BAS #1 that corresponds to the Source-Volume 1, where the BAT #3 is established. If the system is to rollback the Source-Volume 1 to the state at the time when the BAT #1 is established; that is, the Source-Volume 1 is to be rolled back the Snapshot-Volume as shown in FIG. 5D, which is the same as Source-Volume 1 in FIG. 5A), then first, the volume manager freezes all the I/O relating to the specific Source-Volume, and operations that relate to the specific Source-Volume on the cache memory are completed and then cleared (step 1402). In step 1404, a new BAT is established to store the state of Source-Volume 1 at that moment (such as BAT #4 shown by state 352 in FIG. 5D). In step 1406, the relating Snapshot Images are used to form a virtual Source-Volume as shown in FIG. 5D), and the virtual Source-Volume is mapped to the host. Step 1408 establishes a bitmap for tracking the rollback process. Afterwards, the I/O can be resumed (step 1410) so that the host can access the virtual Source-Volume. Afterwards, a restore process is started, where in step 1420, from the relating Snapshot Images, a data record is selected as a first data block for the restore. Selecting DATA-B of Snapshot-Image #1 in FIG. 5D is taken for an example. Step 1422 checks whether the restored flag corresponding to the data block in the bitmap has been set. If the restored flag is set, this means that the data have been restored in the Source-Volume 1. If not, the data are overwritten to the Source-Volume 1 according to the address information on the data block that is originally stored in Source-Volume 1; afterwards, the restored flag of this data record in the bitmap is set (steps 1424 and 1426). It should be noted that during the overwrite process, the copy-on-write procedure is performed at the same time, so that the state of the Source-Volume is reserved by using the new BAT, when the rollback process is initiated. Take state 354 in FIG. 5D for an example. Before DATA-B is overwritten to the data block 212, DATA-K stored in the data block 212 is copied to the BAT #4. Step 1428 checks whether all the data in the relating Snapshot-Image have been restored. If not, then the next data record is obtained from the Snapshot-Images (step 1429), followed by step 1422 until all the data records in the relating Snapshot Images are restored. Afterwards, step 1414 is performed to un-map the above-mentioned virtual Source-Volume. Instead, the actual Source-Volume 1 is mapped and is presented to the host. Finally, the bitmap is deleted (step 1416).

For data in the Source-Volume 1 that do not belong to the Snapshot-Volume at the restoring point, the Source-Volume 1 of state 350 in FIG. 5D is taken for an example, where after establishing the BAT #3, DATA-N of the data block 220 is added into the Source-Volume 1; however, in some embodiments of the present invention, such data are deleted or registered as invalid before step 1414, 50 that the valid data state in the Source-Volume 1 is indeed restored back to the state of the Snapshot Volume #1. Please note that before deleting the data or registering the data as invalid, the data need to be copied to the BAT #4, such as state 354 in FIG. 5D.

In the previous embodiment, step 1404 for establishing a new BAT to reserve the Source-Volume 1 at present moment, is performed when the fact that the system should support the roll-forward function is taken into consideration. That is, although at a particular moment T, the system determines that one or some Source-Volume(s) is (are) to be restored to the data state at an earlier moment T', the system can still determine whether to roll-forward to the data state at the particular moment T according to operation conditions of the system. Moreover, in this embodiment, it is preferred to reserve all the Snapshot-Images between the moment T' and the moment T (such as Snapshot-Images #2 and #3 in FIG. 5D). The system therefore has the function of rolling the Source-Volume forward to any moment between the aforesaid two moments T' and T. Thus, in a system that does not support the roll-forward function, the rollback process does not need to include step 1404, and the overwrite procedure in step 1424 is not accompanied by the step of copying data to the new BAT through using the copy-on-write method, as such a new BAT does not exist. Furthermore, one embodiment of the present invention further includes the step of deleting all the Snapshot-Images between the moment T' and the moment T after the restore process, i.e., after the Source-Volume has been completely restored to the data state at the moment T'. In another embodiment of the present invention, the deleted Snapshot-Images mentioned above include the Snapshot-Image at the moment T', because the data state of the Source-Volume has been restored to the moment T'.

In the above-mentioned embodiment of the present invention, where the rollback process is performed, before restoring the relating Snapshot-Images in the BAS to the Source-Volume, the virtual Source-Volume is mapped to the host, the I/O(s) is (are) resumed (steps 1406 and 1410), and the host deems as if the rollback process were finished, so that during the restore process, the system allows the host to access the Source-Volume without waiting until the entire rollback process is finished. Therefore, the present invention can improve the overall execution efficiency problem caused by performing the rollback process. In addition, the I/O operations of the host, which are done on the Source-Volume during the restore process, are illustrated in FIGS. 15A and 15B.

Figure 15A:
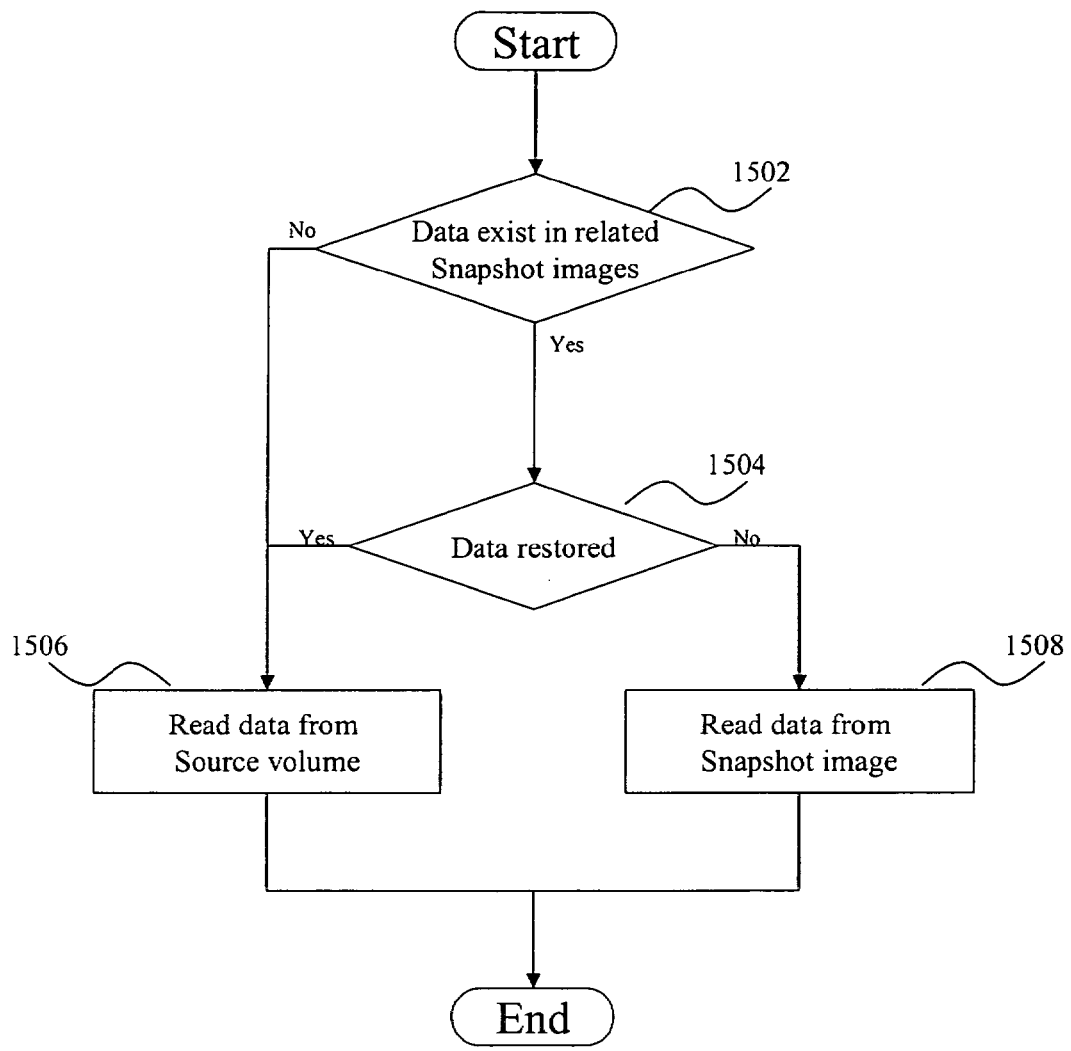
FIG. 15A is a flowchart that shows the steps of performing a restore process according to an embodiment of the present invention.

FIG. 15A depicts a flowchart of an embodiment, where the Source Volume that is being rolled back during the restore process is accessed. First, the system determines whether the data to be read exist in the relating Snapshot-Images (step 1502). Next, please refer to FIG. 5D. If data in one target data blocks of the Source-Volume 1 are to be read, then the relating Snapshot-Images (in the BAS #1) are first searched to determine whether there are any data whose original storage addresses correspond to the target data blocks. If there are such data, step 1504 is performed; otherwise, step 1506 is taken. Step 1504 checks whether or not such data have been restored. If the data are restored, step 1506 is performed to read the data out from the Source-Volume in response to the read request from sender. If the data are not restored, then data are read from the Snapshot Image in response to the read request (step 1508). Example 1: If the data to be read is the data block 210 based on a read request, then because the data block 210 has never been copied to the BAS #1, the data cannot be found in the relating Snapshot Images; therefore, DATA-A in the data block 210 of Source-Volume 1 is directly read in response to the read request. Example 2: If the data to be read is the data block 214 based on a read request, then the Data Block 240 in the Snapshot Image #2, where there is data that is originally stored in the Data Block 214, is found, and the system checks whether or not the restored flag of the data block 240 in the bitmap during the rollback process is set. If the restored flag is set, then the data in the data block 214 of the Source-Volume 1 are read out. If the restored flag is not set, then DATA-C in the data block 240 of the BAS #1 is read out in response to the read request. Because data may be updated after they are restored to Source-Volumes, the data that have been restored have to be read out from the Source-Volume. In other embodiments of the present invention, step 1508 of reading data out from the Snapshot-Images in response to the read request is followed by the steps of overwriting the data to the Source-Volume and of setting the corresponding restored flag in the bitmap.

Figure 15B:
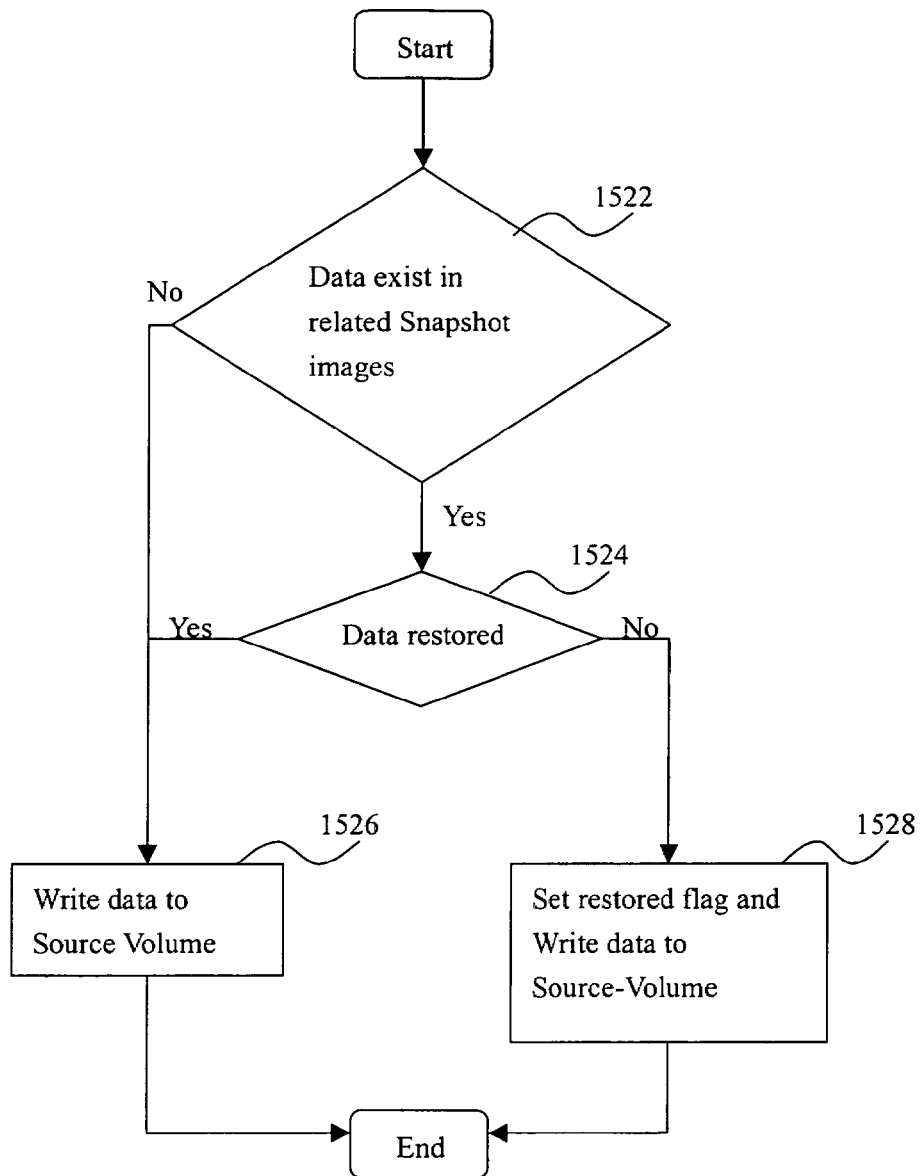
FIG. 15B is a flowchart that shows the steps of performing a write instruction according to an embodiment of the present invention.

FIG. 15B depicts a flowchart of an embodiment, where the Source-Volume that is being rolled back during the restore process is performed with a write operation. Similar to the aforesaid read operation, the system first determines whether or not the relating Snapshot-Images contain the original storage address of the data block to be written (step 1522). If the data block to be written has never been copied to the relating Snapshot-Images, then step 1526 is taken to write the data into the Source-Volume. Otherwise, step 1524 is taken to check whether or not the data are restored. If the data are restored, then step 1526 is taken. If the data are not restored, then a restored flag is set, and the data are written into the Source-Volume (step 1528). In a preferred embodiment of the present invention, a semaphore control mechanism is introduced, so that the write operation in step 1508 and the abovementioned restore process do not operate at the same data block at the same time, which means that data errors caused by competition can be prevented.

The invention being thus described, it will be obvious that the same may be varied in many ways. Such variations are not to be regarded as a departure from the spirit and scope of the present invention, and all such modifications would be obvious to one skilled in the art are intended to be included within the scope of the following claims.

What is claimed is:

1. A storage virtualization computer system, comprising:
a host unit for sending an I/O request;
an external storage virtualization controller (SVC), coupled to the host unit, for executing an I/O operation in response to the I/O request; and
at least one physical storage device (PSD) coupled to the SVC via a serial attached small computer system interface (SCSI) interconnect for providing data storage space to the storage virtualization computer system via the SVC;
wherein the external SVC executes a snapshot function for storing the data state of at least one Source-Volume consisting of the at least one PSD at a particular moment, and said snapshot function is performed via a section allocation system (SAS), said SAS comprises a section allocation table (SAT) and at least one block association set (BAS), said BAS is a basis for performing a point-in-time backup (PIT backup), wherein said SAT comprises a first folder table which records the information which points to each said BAS and information about the Source-Volume which is associated with each said BAS, and when receiving a first write request that writes first data into a first location in said Source-Volume, a copy-on-write procedure is performed to copy data originally stored in data blocks.

2. The computer system according to claim 1, wherein said SAT comprises:
a first attribute block which records a SAS identification (SAS ID) and a media extent identification (media extent ID);
a first folder table which records the information which points to each said BAS and information on the Source-Volume which is associated with each said BAS; and
a metadata field which stores and manages metadata of the SAT, and in which each said BAS comprises:
a second attribute block which stores information on a BAS identification (BAS ID), BAS size, and BAS-related settings;
a directory field which stores a block association table (BAT) level and an amount of established BAT;
a second folder table which stores said BAT; and
a data area which stores at least one Snapshot-Image.

3. The computer system according to claim 1, wherein the at least one PSD comprises a plurality of PSDs, and said PSDs comprise at least one first communication protocol PSD and at least one second communication protocol PSD, both of which are coupled to the SVC via the serial attached SCSI interconnect.

4. The computer system according to claim 3, wherein said first communication protocol is a serial attached SCSI communication protocol, and said second communication protocol is a serial advanced technology attachment (SATA) communication protocol.

5. The computer system according to claim 3, wherein said SAT comprises:
a first attribute block which records a SAS identification (SAS ID) and a media extent identification (media extent ID); and
a metadata field which stores and manages metadata of the SAT.

6. The computer system according to claim 5, wherein the SAT further comprises:
a first journal field which stores an operation journal for data recovery, in the event of system breakdown or power failure.

7. The computer system according to claim 6, wherein each said BAS comprises:
a second attribute block which stores information on a BAS identification (BAS ID), BAS size, and BAS-related settings;
a directory field which stores a block association table (BAT) level and an amount of established BAT;
a second folder table which stores said BAT; and
a data area which stores at least one Snapshot- Image.

8. The computer system according to claim 7, wherein said BAS further comprises a second journal field which stores an operation journal for data recovery, in the event of system breakdown or power failure.

9. The computer system according to claim 3, wherein said Source-Volume is stored in said at least one first communication protocol PSD, and said SAS is stored in said at least one second communication protocol PSD.

10. The computer system according to claim 9, wherein said first communication protocol is serial attached SCSI communication protocol, and said second communication protocol is SATA communication protocol.

11. The computer system according to claim 9, wherein said PSDs are hard Disks.

12. A method of managing data in a storage system, comprising the steps of:
   establishing a section allocation system (SAS) that comprises at least one media extent;
   establishing a section allocation table (SAT) and at least one block association set (BAS) in said media extent, wherein said SAT has a field containing information pointing to said BAS, said BAS corresponds to a Source-Volume as the basis for performing a Snapshot backup thereof, and said BAS is a basis for performing a point-in-time backup (PIT backup);
   establishing a block association table(BAT) in said BAS, wherein said BAT is used to store cross-reference information in order to correspond to backup data with an original storage address;
   when receiving a first write request that writes data into a first location in said Source-Volume, a copy-on-write procedure is performed to copy data originally stored in data blocks and a logical block address (LBA) of each data block of said data blocks, to a Snapshot-Image, and said data are teen into said Source-Volume in order to overwrite the data originally stored in the data blocks; and
   when receiving a second write request that is later than said first write request, and that writes second data into said first location in said Source-Volume, said second data are directly written into said first location in said Source-Volume in order to overwrite said first location without performing said copy-on-write procedure.

13. The method according to claim 12, wherein said SAT comprises:
   a first attribute block which records a SAS identification (SAS ID) and a media extent identification (media extent ID);
   a first folder table which records the information which points to each said BAS and information on the Source-Volume which is associated with each said BAS; and
   a metadata field which stores and manages metadata of the SAT.

14. The method according to claim 13, wherein the SAT further comprises
   a first journal field which stores an operation journal for data recovery, in the event of system breakdown or power failure.

15. The method according to 14, wherein each said BAS comprises:
   a second attribute block which stores information on a BAS identification (BAS ID), BAS size, and BAS-related settings;
   a directory field which stores a block association table (BAT) level and an amount of established BAT;
   a second folder table which stores said BAT; and
   a data area which stores at least one Snapshot-Image.

16. The method according to claim 15, wherein said BAS further comprises a second journal field which stores an operation journal for data recovery, in the event of system breakdown or power failure.

17. The method according to claim 12, further comprising a mechanism for pruning said Snapshot-Images.

18. The method according to claim 12, further comprising a prune mechanism which comprises the steps of:
   selecting an earliest BAT;
   checking a valid storage life of said earliest BAT; and
   deleting said earliest BAT and its Snapshot-Images, if expired.

19. The method according to claim 18, further comprising the steps of:
   subsequently repeating the step of selecting the earliest BAT; repeating aforesaid step of checking said valid storage life of said selected BAT; and repeating aforesaid step of deleting said selected BAT and its Snapshot-Images, if expired until said selected BAT has said valid storage life.

20. The method according to claim 12, wherein said storage system comprises a plurality of PSDs, and said PSDs comprise at least one first communication protocol PSD and at least one second communication protocol PSD, both of which are coupled to a storage virtualization controller (SVC) via a serial attached small computer system interface (SCSI) interconnect.

21. The method according to claim 20, wherein said first communication protocol is a serial attached small computer system interface (SCSI) communication protocol, and said second communication protocol is a serial advanced technology attachment (SATA) communication protocol.

22. The method according to claim 20, wherein said Source-Volume is stored in said at least one first communication protocol PSD, and said SAS is stored in said at least one second communication protocol PSD.

23. The method according to claim 22, wherein said first communication protocol is serial attached SCSI communication protocol, and said second communication protocol is SATA communication protocol.

24. The method according to claim 22, wherein said PSDs are hard disks.

25. The method according to claim 12, further comprising a procedure for purging said Snapshot-Images.

26. The method according to claim 12, further comprising a purge procedure which comprises the steps of:
   checking a setting of each said BAT;
   selecting a target BAT to be deleted;
   merging relating Snapshot-Images, if there exists a purge target; and
   deleting said target BAT and said relating Snapshot-Images.

27. The method according to claim 26, further comprising the steps of: checking whether an available space is sufficient, and if not, then repeat the purge procedure until said space is sufficient.

28. The method according to claim 26, wherein the setting comprises a priority or a storage life.

29. The method according to claim 26, wherein if there is no appropriate target, then a corresponding event-handling policy is started.

30. The method according to claim 29, wherein said event-handling policy comprises the step of: aborting creation of a new BAT.

31. The method according to claim 29, wherein said event-handling policy comprises the step of: invalidating an I/O.

32. A storage virtualization computer system, comprising:
   a host unit for sending an I/O request;
   an external storage virtualization controller (SVC), coupled to the host unit, for executing an I/O operation in response to the I/O request; and
   at least one physical storage device (PSD) coupled to the SVC via a serial attached small computer system interface (SCSI) interconnect for providing data storage space to the storage virtualization computer system via the SVC;

wherein the external SVC executes a snapshot function for storing the data state of at least one Source-Volume consisting of the at least one PSD at a particular moment, and said snapshot function is performed via a section allocation system (SAS), and when receiving a first write request that writes first data into a first location in said Source-Volume, a copy-on-write procedure is performed to copy data originally stored in data blocks and a logical block address (LBA) of each data block of said data blocks, to a Snapshot-Image, and said first data are written into said Source-Volume in order to overwrite the data originally stored in the data blocks; and when receiving a second write request that is later than said first write request, and that writes second data into said first location in said Source-Volume, said second data are directly written into said first location in said Source-Volume in order to overwrite said first location without performing said copy-on-write procedure.

33. The computer system according to claim 32, wherein said SAS comprises a section allocation table (SAT) and at least one block association set (BAS), said BAS is a basis for performing a point-in-time backup (PIT backup).

34. The computer system according to claim 33, wherein said SAT comprises:
a first attribute block which records a SAS identification (SAS ID) and a media extent identification (media extent ID);
a first folder table which records the information which points to each said BAS and information on the Source-Volume which is associated with each said BAS;
a metadata field which stores and manages metadata of the SAT, and in which each said BAS comprises:
a second attribute block which stores information on a BAS identification (BAS ID), BAS size, and BAS-related settings;
a directory field which stores a block association table (BAT) level and an amount of established BAT;
a second folder table which stores said BAT; and
a data area which stores at least one Snapshot-Image.

35. The computer system according to claim 32, wherein the at least one PSD comprises a plurality of PSDs, and said PSDs comprise at least one first communication protocol PSD and at least one second communication protocol PSD, both of which are coupled to the SVC via the serial attached SCSI interconnect.

36. The computer system according to claim 35, wherein said first communication protocol is a serial attached SCSI communication protocol, and said second communication protocol is a serial advanced technology attachment (SATA) communication protocol.

37. The computer system according to claim 35, wherein said Source-Volume is stored in said at least one first communication protocol PSD, and said SAS is stored in said at least one second communication protocol PSD.

38. The computer system according to claim 37, wherein said first communication protocol is serial attached SCSI communication protocol, and said second communication protocol is SATA communication protocol.

* * * * *